(12) United States Patent
Sabaldan Elpedes et al.

(10) Patent No.: US 11,614,225 B1
(45) Date of Patent: Mar. 28, 2023

(54) REFLEX SIGHT

(71) Applicant: Trijicon, Inc., Wixom, MI (US)

(72) Inventors: Jerry Glen Sabaldan Elpedes, Milford, MI (US); Nathan Stewart, Hartland, MI (US)

(73) Assignee: Trijicon, Inc., Wixom, MI (US)

( * ) Notice: Subject to any disclaimer, the term of this patent is extended or adjusted under 35 U.S.C. 154(b) by 0 days.

(21) Appl. No.: 17/545,500

(22) Filed: Dec. 8, 2021

(51) Int. Cl.
*F21V 23/04* (2006.01)
*F41G 1/34* (2006.01)
*G02B 23/16* (2006.01)

(52) U.S. Cl.
CPC .......... *F21V 23/0464* (2013.01); *F41G 1/345* (2013.01); *G02B 23/16* (2013.01)

(58) Field of Classification Search
CPC ...... F21V 23/0464; F41G 1/345; G02B 23/16
See application file for complete search history.

(56) References Cited

U.S. PATENT DOCUMENTS

| 6,327,806 | B1 | 12/2001 | Paige | |
|---|---|---|---|---|
| 2002/0078618 | A1* | 6/2002 | Gaber | F41G 1/30 |
| | | | | 42/123 |
| 2009/0193705 | A1 | 8/2009 | LoRocco | |
| 2010/0077645 | A1 | 4/2010 | LoRocco | |
| 2012/0151816 | A1 | 6/2012 | Kleck et al. | |
| 2015/0369565 | A1 | 12/2015 | Kepler | |
| 2018/0172399 | A1 | 6/2018 | Ben Zion et al. | |
| 2018/0347948 | A1* | 12/2018 | VanCamp | F41G 1/30 |
| 2018/0372448 | A1 | 12/2018 | Noskowicz | |
| 2021/0055536 | A1 | 2/2021 | DeAngelis | |
| 2021/0349300 | A1* | 11/2021 | Sheets, Jr. | F41G 1/38 |

FOREIGN PATENT DOCUMENTS

WO    WO-2011075028 A1 *  6/2011  ............... F41G 1/30

* cited by examiner

*Primary Examiner* — Alan B Cariaso
(74) *Attorney, Agent, or Firm* — Harness, Dickey & Pierce, P.L.C.

(57) ABSTRACT

An optical sight includes a housing, an optical element supported by the housing, a sensor positioned in the housing, a light source configured to selectively illuminate a reticle on the optical element, and a controller configured to control illumination of the reticle based on an output from the sensor. The sensor is configured to detect ambient light at a target object. The controller is configured to control the light source to constantly illuminate the reticle based on a first output from the sensor and illuminate the reticle in pulses based on a second output from the sensor. The first output is different from the second output.

20 Claims, 15 Drawing Sheets

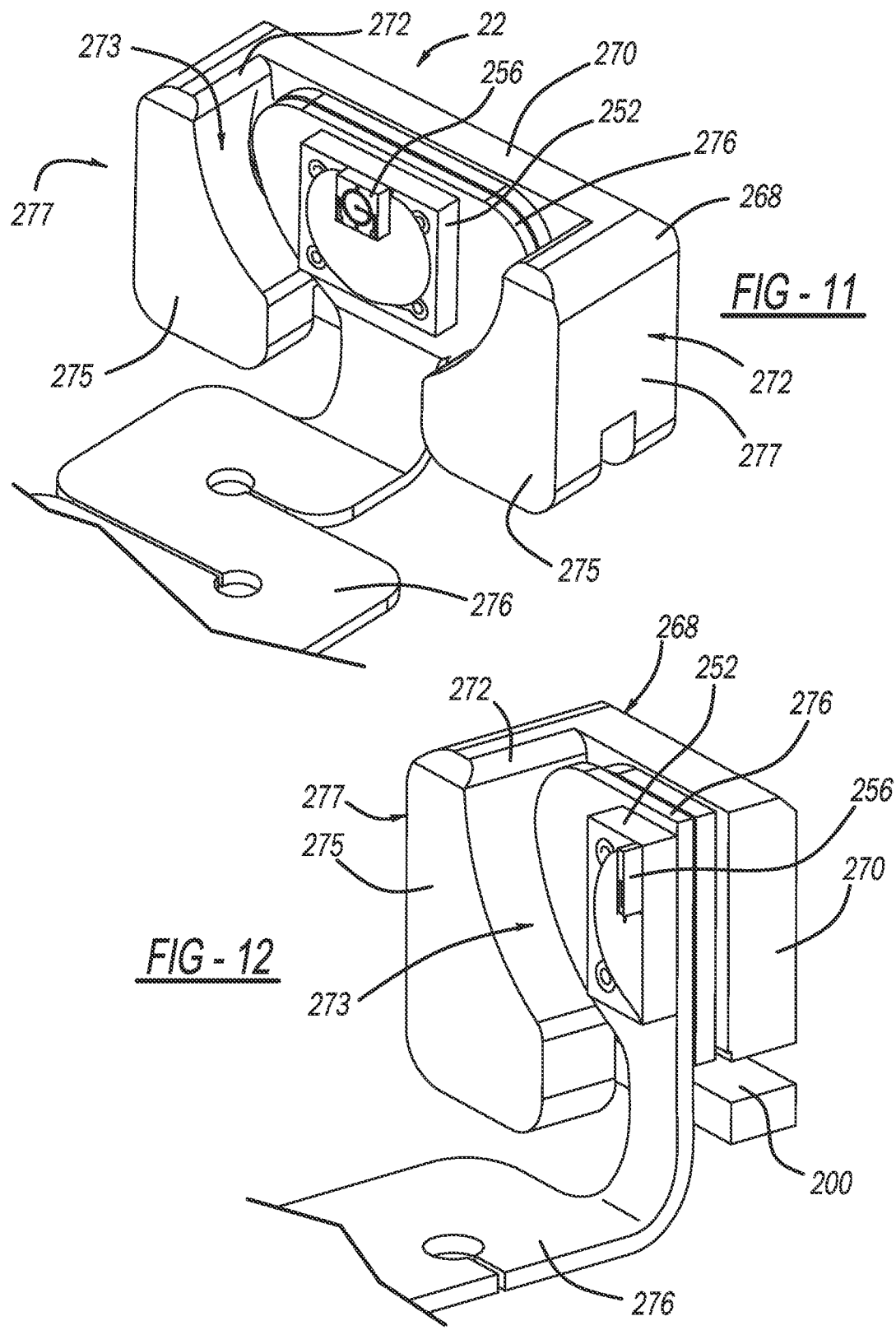

REFLEX SIGHT

FIELD

The present disclosure relates to a reflex sight, and, more specifically, to a reflex sight having a front-facing photo sensor.

BACKGROUND

This section provides background information related to the present disclosure which is not necessarily prior art.

Optical sights are typically used in conjunction with a firearm to aid a shooter in properly aligning a barrel of the firearm with a desired target. Properly aligning the barrel of the firearm relative to a target results in a projectile fired from the firearm impacting the target at a desired location. Conventional optical sights are typically mounted at a top surface of the firearm and include an aiming point for use by the shooter in aligning the optical sight and, thus, the barrel of the firearm relative to the target. Such aiming points may be illuminated to further aid a shooter in quickly and accurately aligning the optical sight and firearm relative to a target.

Optical sights may be used in conjunction with a variety of firearms and, as such, may provide different features depending on the particular firearm and/or application. For example, optical sights designed for use in close-target situations are compact and designed to allow a shooter to quickly train the optical sight and firearm on a target. One such optical sight is a so-called reflex sight that is useful in close-target situations by providing the shooter with fast-target acquisition and aiming of a firearm. Such reflex sights are typically more compact than an optical sight used on a rifle, for example, to allow mounting of other systems on the firearm (i.e., laser pointers, ranging devices, etc.) and to reduce the overall size and weight of the combined firearm and optical sight. Further, such reflex sights provide a field-of-view that allows the shooter to quickly position the optical sight and firearm relative to a target without reducing the situational awareness of the shooter.

A reticle may indicate an aiming point on the field-of-view. Reflex sights typically require an illumination device to illuminate the reticle. The illumination device may be powered by a power source. Some reflex sights use photo sensors to sense ambient light conditions and determine a brightness of the illumination device based on the ambient light condition. The photo sensors sample current ambient light conditions and provide information to a microcontroller in the optic to adjust the reticle brightness.

SUMMARY

This section provides a general summary of the disclosure, and is not a comprehensive disclosure of its full scope or all of its features.

An example optical sight includes a housing, an optical element supported by the housing, a sensor positioned in the housing, a light source configured to selectively illuminate a reticle on the optical element, and a controller configured to control illumination of the reticle based on an output from the sensor. The sensor is configured to detect ambient light at a target object. The controller is configured to control the light source to constantly illuminate the reticle based on a first output from the sensor and illuminate the reticle in pulses based on a second output from the sensor. The first output is different from the second output.

The light source may include a light emitting diode, a fiber optic, a tritium lamp, a laser, or a combination thereof.

The light source may include a plurality of light sources.

The controller may be configured to control illumination of the light source using pulse width modulation, discrete illumination, or a combination of these.

The controller may be configured to control illumination of the light source using only pulse width modulation for a portion of brightness settings and using a combination of pulse width modulation and discrete illumination for a portion of brightness settings.

An example method for controlling brightness of a reticle on an optical sight includes: illuminating, by a light source, a reticle on an optical element; controlling, by a controller, a brightness of the illuminating by the light source according to an output from a sensor and a first brightness curve, the first brightness curve being stored in a memory of the controller; switching, by the controller, from the first brightness curve to a second brightness curve based on a user input, the second brightness curve being stored in the memory of the controller; and controlling, by the controller, the brightness of the illuminating by the light source according to the output from the sensor and the second brightness curve when the first brightness curve is switched by the controller to the second brightness curve.

The switching from the first brightness curve to the second brightness curve may include detecting the user input through actuation of an actuator.

The second brightness curve may be a dimmer curve than the first brightness curve and may correspond to a decreased brightness user input.

The second brightness curve may be a brighter curve than the first brightness curve and may correspond to an increased brightness user input.

An example optical sight may include a housing, an optical element supported by the housing, a light source configured to illuminate a first reticle and a second reticle on the optical element, and a controller configured to control the light source to selectively illuminate the first reticle based on a first of a plurality of brightness curves and selectively illuminate the second reticle based on a second of the plurality of brightness curves. The controller is configured to change one of the first and the second of the plurality of brightness curves based on a user input to change a brightness of the one of the first and the second reticles relative to the other of the first and the second reticles.

The light source may include a light emitting diode, a fiber optic, a tritium lamp, a laser, or a combination thereof.

The user input may be a brightness control button.

The plurality of brightness curves may include a dim brightness curve, a first reticle default brightness curve, a second reticle default brightness curve and a bright brightness curve. The controller may be configured to control the light source to selectively illuminate the first reticle based on the first reticle default brightness curve and the second reticle based on the second reticle default brightness curve until the user input is selected.

The user input may be configured to be manipulated to select between the dim brightness curve, the first reticle default brightness curve, and the bright brightness curve.

The controller may be configured to illuminate the first reticle based on the first reticle default curve and to illuminate the second reticle based on the bright brightness curve when the user input is selected.

The optical sight may include a light sensor. The light sensor may be a photo detector configured to detect ambient light at a target object, and the controller may be configured to control the light source to selectively illuminate the first reticle and the second reticle based on an output from the light sensor.

The photo detector may be disposed on a downrange-facing portion of the housing.

The user input may be a brightness control button.

The plurality of brightness curves may be stored in a memory of the controller.

The controller may be configured to control the light source to selectively illuminate the first reticle and the second reticle based on one of a plurality of brightness curves using a combination of pulse width modulation and discrete illumination.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 11 is a detail view of an illumination assembly of the optical sight in FIG. 2.

FIG. 12 is a cross-sectional view of the illumination assembly in FIG. 11.

Corresponding reference numerals indicate corresponding parts throughout the several views of the drawings.

DETAILED DESCRIPTION

Figure 1:
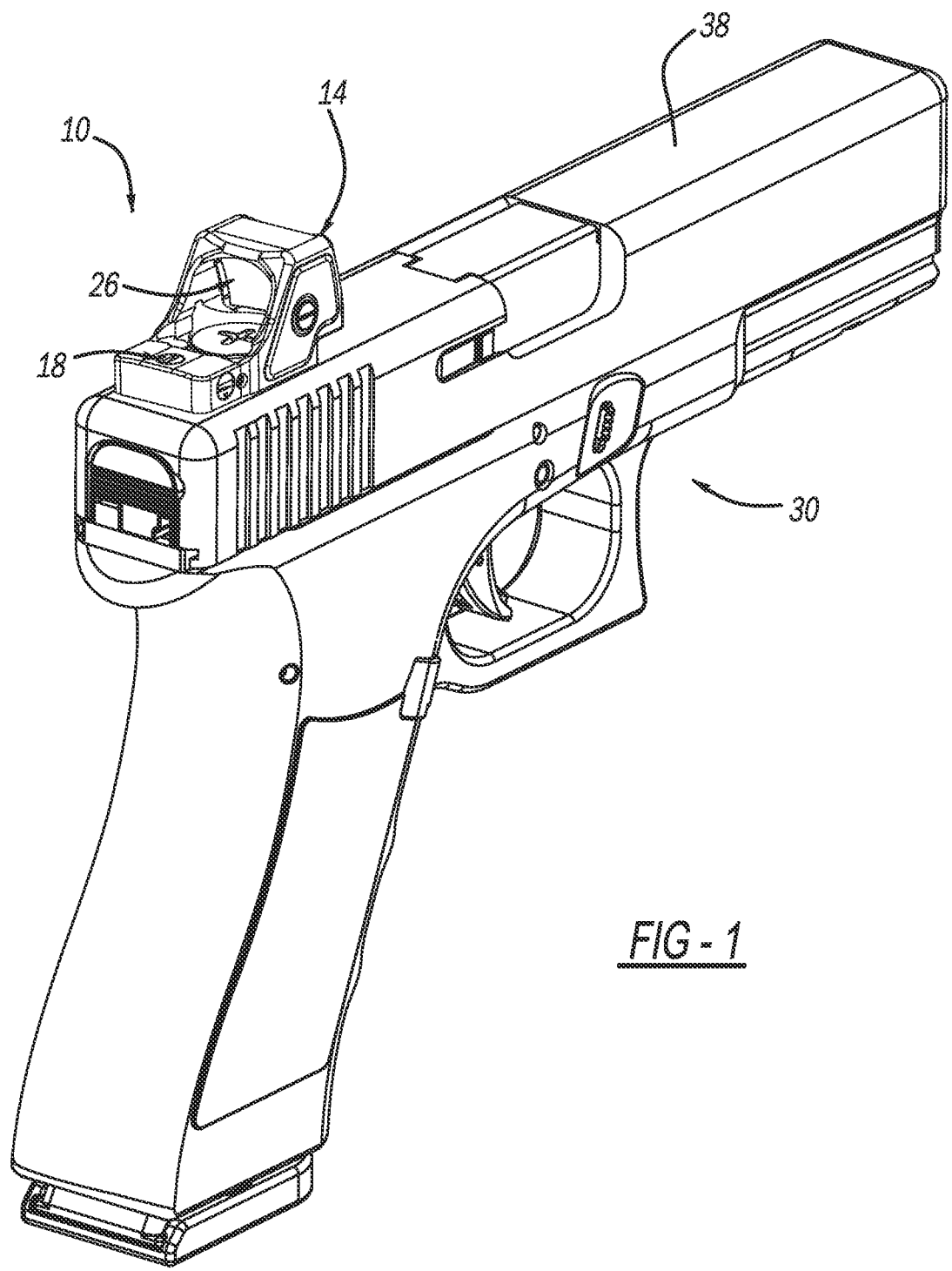
FIG. 1 is a perspective view of an example firearm including an optical sight according to the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Reflex sights typically require an illumination device to illuminate a reticle. The illumination device may be powered by a power source. Some reflex sights use photoelectric sensors to sense ambient light conditions and determine a brightness of the illumination device based on the ambient light condition. The photoelectric sensors sample current ambient light conditions and provide information to a microcontroller in the optic to adjust the reticle brightness. The receiver detects the change in light and converts the change to an electrical output.

The photoelectric sensor may be positioned in a location to optimize the sensing of the ambient light conditions and provide an accurate interpretation of the target scene. Positioning the photoelectric sensor to be front-facing and towards a top of the optic provides a better vantage point to detect ambient light at the target scene. The optic having the more accurate detection of ambient light may then provide an appropriate reticle brightness for the target scene.

The photoelectric sensor location of the present disclosure is advantageous over photoelectric sensor locations currently used in the industry. Photoelectric sensors placed near the light source within the housing of the optic may be buried deep and light from the target scene may be partially obscured by the lens and/or housing. Light sources, natural or otherwise, may be reflected from the rear of the optic and therefor tarnish the interpretation of the target scene by the photoelectric sensor if the photoelectric sensor is disposed nearby. Photoelectric sensors located on a top of the housing, above the lens, and pointing upwards may be well-exposed but located improperly, such that light conditions are sampled above the optic but not at the target scene. Photoelectric sensors placed beneath the lens may be well exposed to light but may be obscured by the pistol slide or backup iron sights when the optic is installed on the firearm, thus diminishing the accuracy of the detection of light at the target scene.

Thus, current locations of photoelectric sensors in the industry may be inaccurate in many situations, including, for example, when there is a bright light at the weapon and low light at the target and when there is low light at the weapon and bright light at the target. Each of these situations would result in the aiming point being either too bright or too dim. The photoelectric sensor of the present disclosure solves these issues by accurately detecting light at the target scene, without being obscured by portions of the optics housing, the firearm, or backup sights. With an accurate detection of light at the target scene, the controller may accurately control illumination of the reticle such that the brightness is appropriate for the ambient light conditions.

Figure 2:
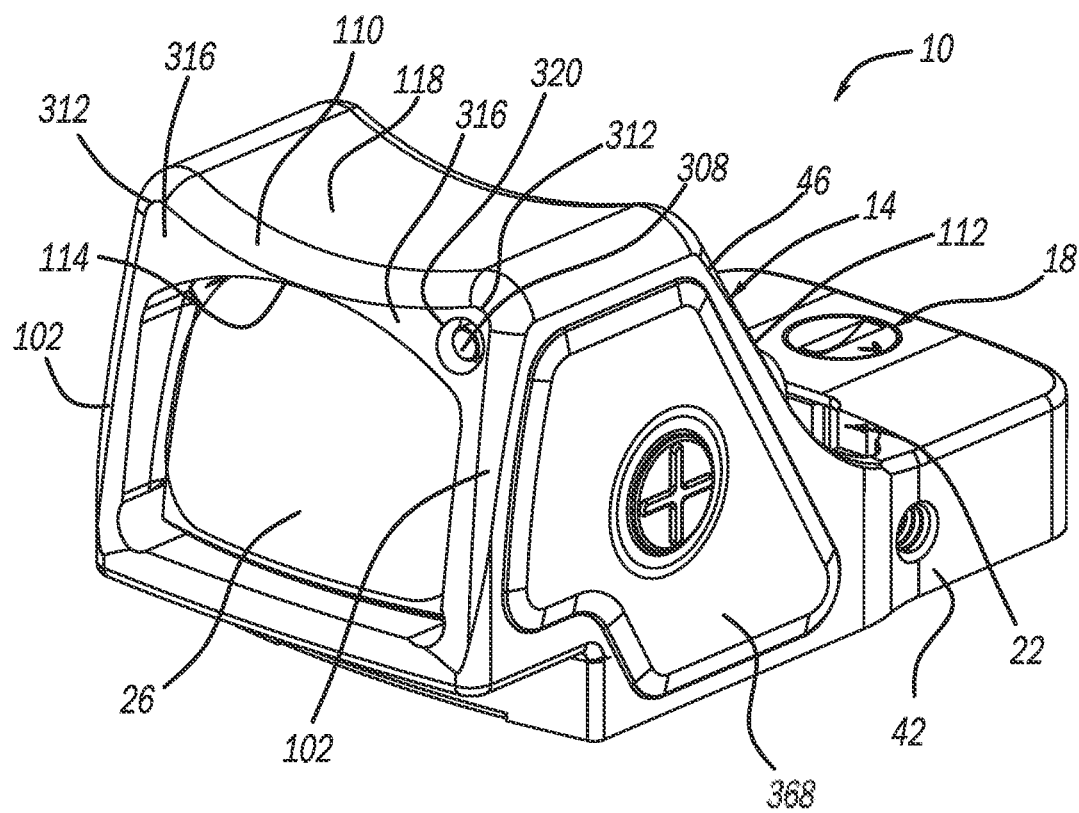
FIG. 2 is a perspective view of an example optical sight according to the present disclosure.
Figure 3A:
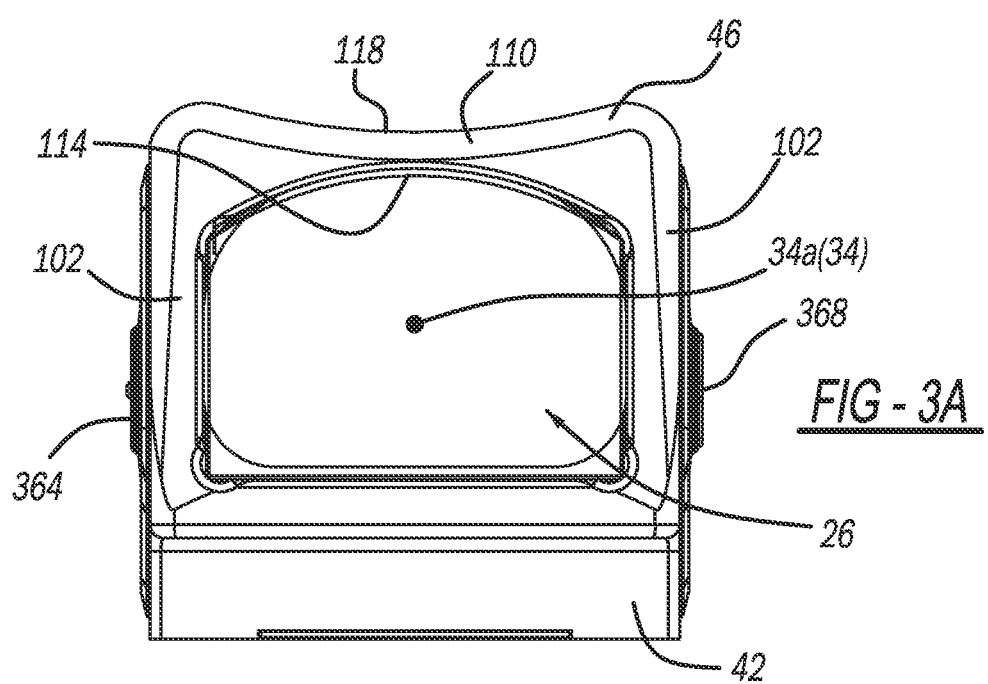
FIG. 3A is a rear view of an example reticle on an optical element of the optical sight in FIG. 2.
Figure 3B:
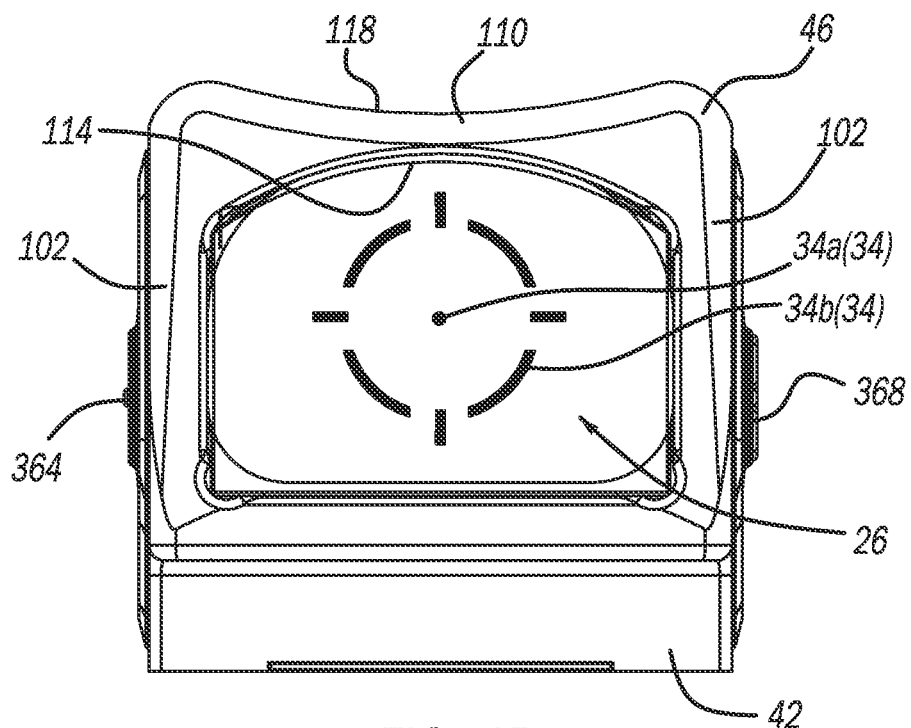
FIG. 3B is a rear view of another example reticle on an optical element of the optical sight in FIG. 2.

Now referring to FIGS. 1-3, an example optical sight 10 according to the present disclosure is illustrated. The optical sight 10 may be a reflex sight. The optical sight 10 includes a housing 14, an adjustment assembly 18, an illumination assembly 22, and an optical element 26. Each of the adjustment assembly 18, the illumination assembly 22, and the optical element 26 may be supported by, and attached to, the housing 14, such that the housing 14 supports the adjustment assembly 18, illumination assembly 22, and the optical element 26 relative to a firearm 30. When the housing 14 is mounted to the firearm 30, the illumination assembly 22 may cooperate with the optical element 26 to display a reticle 34 on the optical element 26 to facilitate alignment of a trajectory of the firearm 30 with a target object (not shown). The adjustment assembly 18 may interact with the illumination assembly 22 to move the illumination assembly 22 relative to the housing 14 to adjust a position of the reticle 34 relative to the optical element 26. While the optical sight 10 may be used with various firearms, the optical sight 10 will be described hereinafter and shown in the drawings as being associated with a barrel 38 of the firearm 30.

Referring to FIGS. 2-6, the housing 14 may include a main body 42 and an upwardly extending optical element housing 46 extending generally from the main body 42. The main body 42 may include a first aperture 50 formed through a top surface 54 and a second aperture 58 formed through a side surface 62. The top surface 54 may include a series of graduations 66 generally surrounding a perimeter of the first aperture 50, while the side surface 62 may likewise include a series of graduations 70 that generally surround an outer perimeter of the second aperture 58. The graduations 66, 70 may cooperate with the adjustment assembly 18 to position the illumination assembly 22 relative to the optical element 26, as will be described further below.

The main body 42 may also include a recess 74. The recess 74 allows the illumination assembly 22 to direct light generally from the main body 42 of the housing 14 toward the optical element 26. The recess 74 may be formed generally between a pair of attachment apertures 78 that are disposed generally within the recess 74 and between the main body 42 and the upwardly extending optical element housing 46. The attachment apertures 78 selectively receive a pair of fasteners 82 that removably attach the housing 14 to the firearm 30.

In one configuration, the fasteners 82 include a threaded shank 86, a head portion 90, and a taper 94 extending generally between the threaded shank 86 and the head portion 90. The head portion 90 may include a hexagonal recess 96 as well as a longitudinal slot 98 that cooperate with an external tool (not shown) to rotate the fasteners 82 relative to the main body 42 of the housing 14 and selectively attach the housing 14 to the firearm 30. The hexagonal recess 96 may be used with a tool having a mating male portion while the longitudinal slot 98 may be used with a tool having a substantially flat male end. While the head portion 90 is described as including the hexagonal recess 96 and the longitudinal slot 98 that receive tools having a respective mating configuration, the longitudinal slot 98 may be sized such that any flat surface can be used to rotate the fasteners 82 relative to the housing 14. For example, the longitudinal slots 98 may include a sufficient width and thickness to allow a spent shell casing to be used to rotate the fasteners relative to the housing 14.

Figure 4:
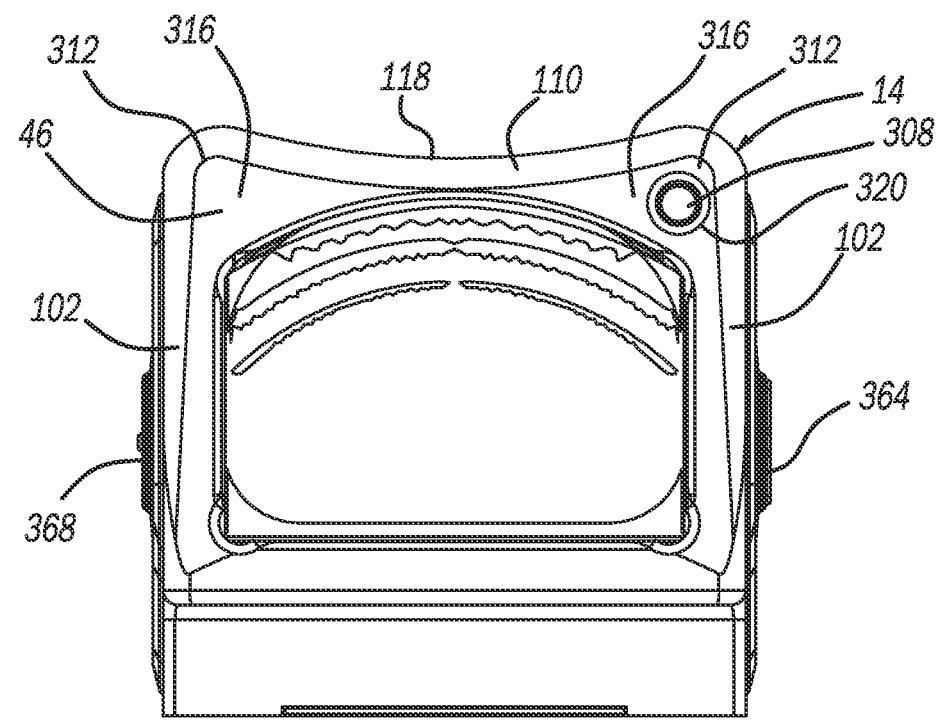
FIG. 4 is a front view of the optical sight in FIG. 2.
Figure 5:
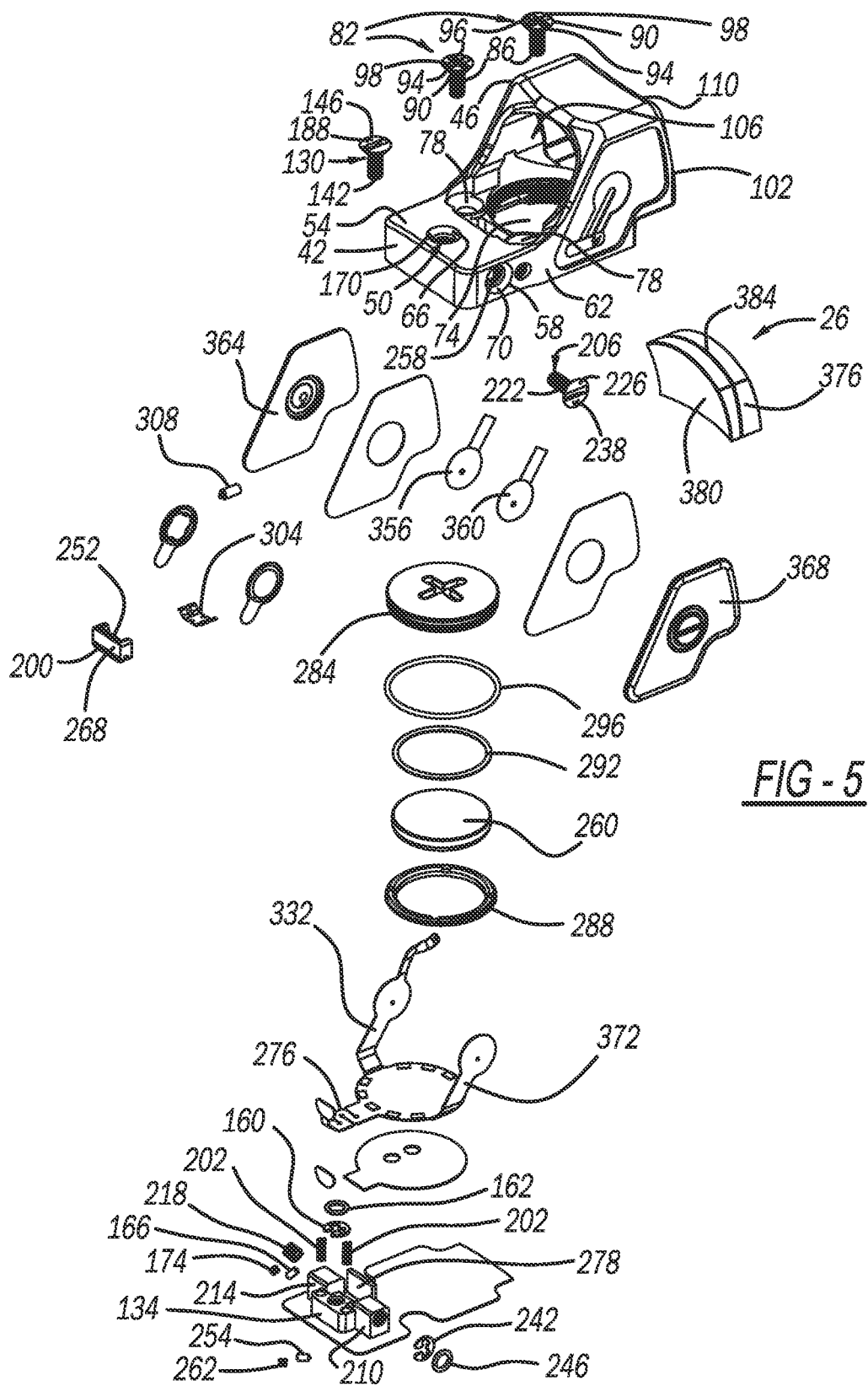
FIG. 5 is an exploded view of the optical sight in FIG. 2.
Figure 6:
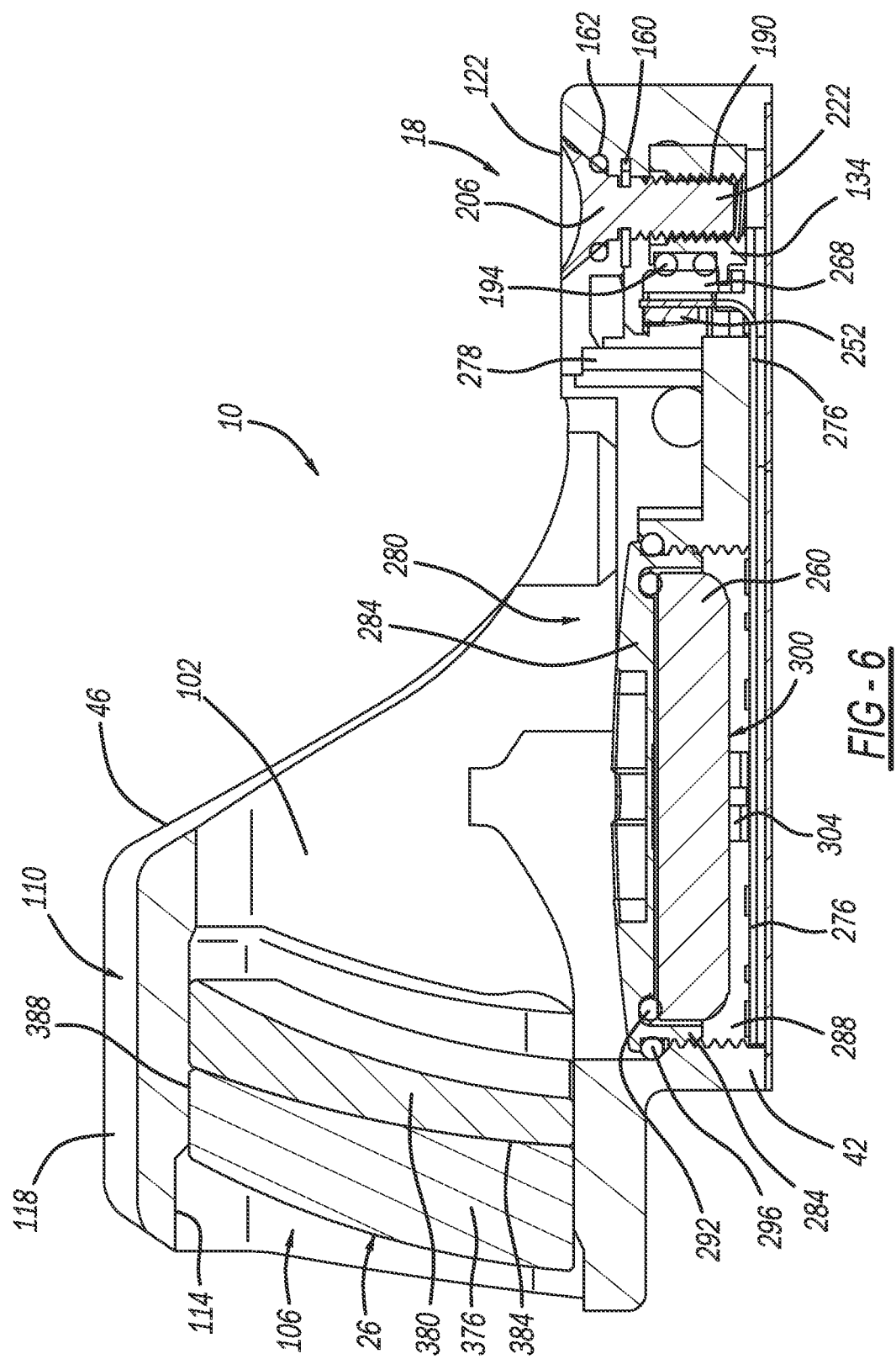
FIG. 6 is a cross-sectional view of the optical sight in FIG. 2, taken along a longitudinal axis of the optical sight.

With particular reference to FIGS. 4-6, the upwardly extending optical element housing 46 is shown and may include a pair of posts 102, an opening 106, and a cross member 110 extending generally over the opening 106 and between the posts 102. The posts 102 may extend generally perpendicular to the main body 42. A rear wall 112 of each post 102 may be formed at an angle from about 30 degrees (30°) to about 90°, and from about 45° to about 60° relative to the main body 42 and may extend a predetermined distance above the opening 106. The opening 106 may include a generally D-shape to accommodate the optical element 26 therein. The cross member 110 provides the opening 106 with the D-shape and may include a bottom surface 114 opposing the opening 106 having a convex shape corresponding to the optical element 26 and a top surface 118 having a concave shape. The concave shape of the top surface 118 allows the top surface 118 to extend from the main body 42 a shorter distance than each of the posts 102. In other words, the posts 102 extend from the main body 42 a greater distance than does the top surface 118 of the cross member 110. As such, should the housing 14 be dropped such that the upwardly extending optical element housing 46 contacts a hard surface, the force associated with the upwardly extending optical element housing 46 contacting the hard surface is received by a distal end of each post 102 and is transmitted to the main body 42 rather than being received at the generally convex bottom surface 114 of the cross member 110. Transmitting forces generally away from the opening 106 and through the posts 102 toward the main body 42 protects the optical element 26 disposed within the opening 106 and prevents the optical element 26 from being fractured should the housing 14 be dropped or suffer an impact event.

The main body 42 and upwardly extending optical element housing 46 may be integrally, and monolithically, formed and may be formed of a one-piece metal construction. Forming the main body 42 and the upwardly extending optical element housing 46 as a one-piece metal body strengthens the housing 14 and allows the housing 14 to withstand forces applied to either the main body 42 or the upwardly extending optical element housing 46. In particular, forces applied to the posts 102 of the upwardly extending optical element housing 46 are directly transferred from the upwardly extending optical element housing 46 to the main body 42. Such forces are therefore diverted away from the optical element 26, thereby protecting the optical element 26, as described above. Forming the main body of a one-piece metal construction enhances the ability of the posts 102 in transmitting forces from a distal end of each post 102 to the main body 42.

The adjustment assembly 18 may be supported by the housing 14 and may adjust a position of the illumination assembly 22 relative to the housing 14 to adjust a position of the reticle 34 relative to the optical element 26. The adjustment assembly 18 may include a height-adjustment mechanism, or elevation-adjustment mechanism, 122 that adjusts an UP/DOWN position of the reticle 34 and a windage-adjustment mechanism, or lateral adjustment mechanism, 126 that adjusts a left-right position of the reticle 34 relative to the optical element 26.

Figure 7:
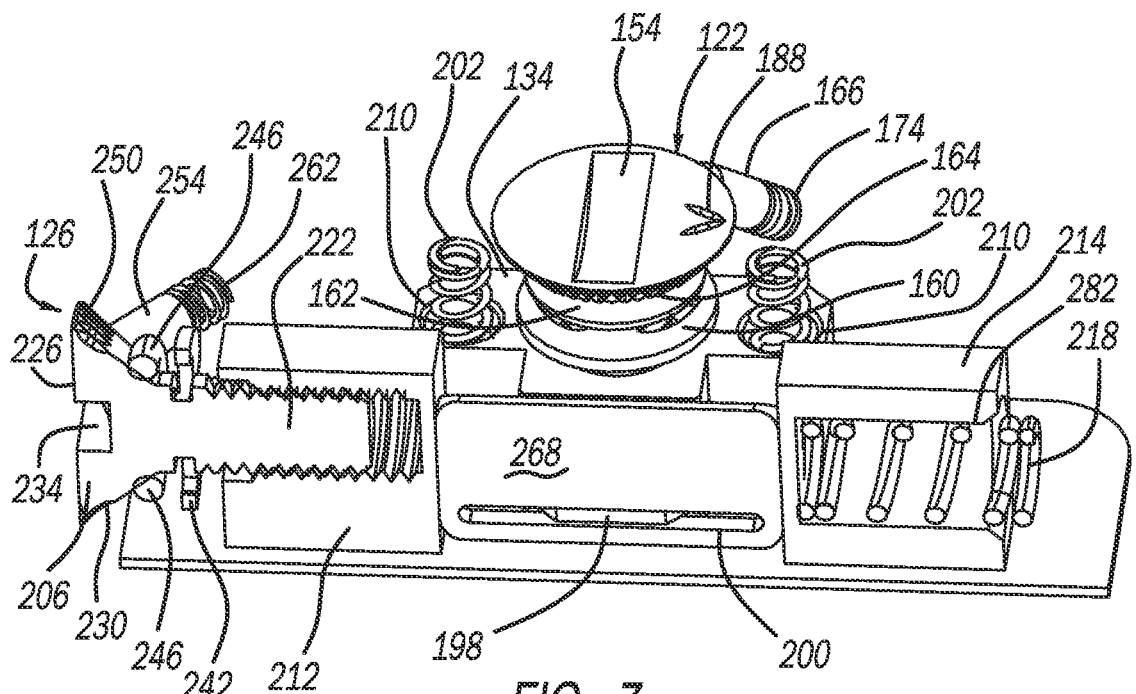
FIG. 7 is a cross-sectional view of the adjustment mechanism of the optical sight in FIG. 2, taken along a longitudinal axis of a windage adjustment mechanism.
Figure 8:
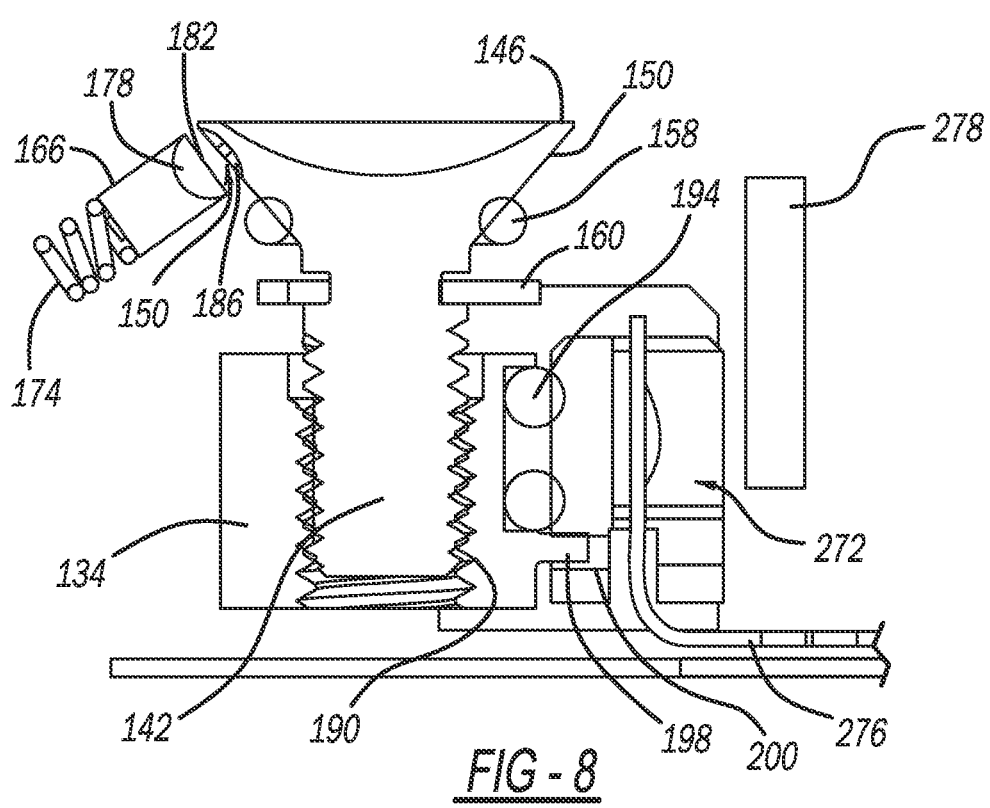
FIG. 8 is a cross-sectional view of the adjustment mechanism of the optical sight in FIG. 2, taken along a longitudinal axis of an elevation adjustment mechanism.
Figure 9:
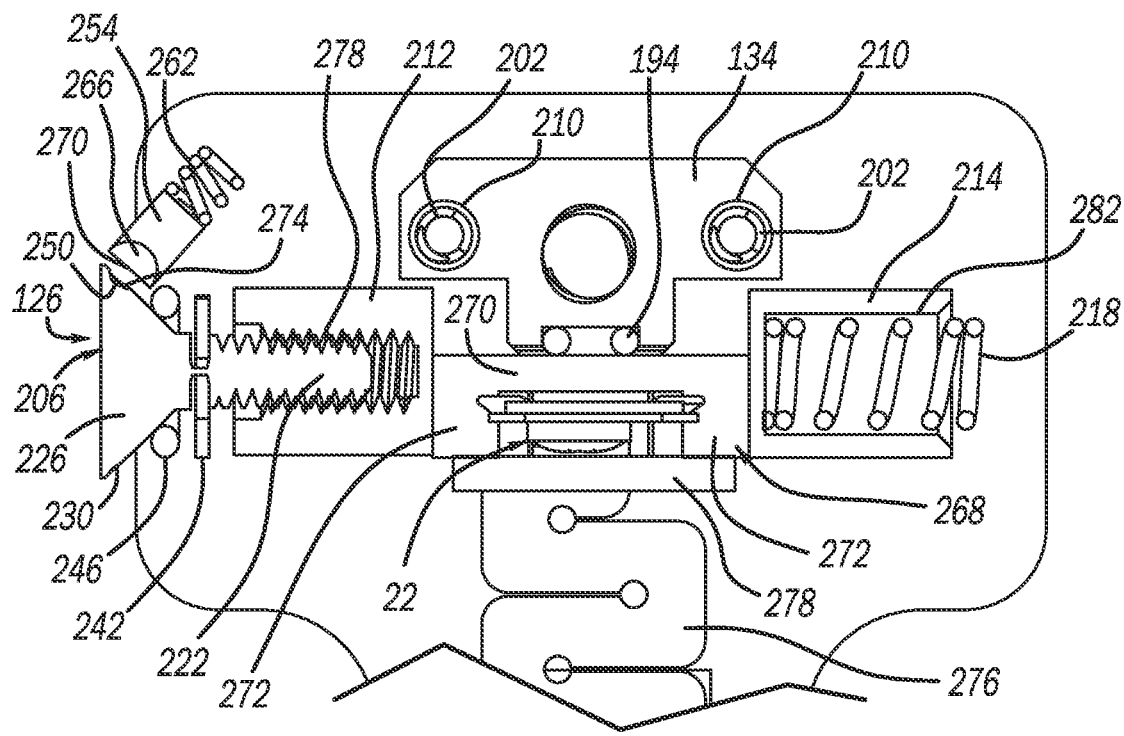
FIG. 9 is a cross-sectional view of the adjustment mechanism of the optical sight in FIG. 2, taken along a plane bisecting the z-axis of the adjustment mechanism.

Referring to FIGS. 7-9, the height-adjustment mechanism 122 may include an adjustment screw 130 and an adjuster block 134. The adjustment screw 130 may be rotatably received within the first aperture 50 of the main body 42 and may be rotated relative to the graduations 66. The adjustment screw 130 may include a threaded body 142, a head 146, and a taper 150 extending generally between the threaded body 142 and the head 146. The head 146 may include a slot 154 to allow a tool (not shown) to be inserted into the head 146 to rotate the head 146 relative to the housing 14. A seal 158 may be disposed between the taper 150 of the adjustment screw 130 and an inner surface of the first aperture 50 to prevent debris from entering the main body 42. In one configuration, the seal 158 is an O-ring seal that is received generally around the taper 150 of the adjustment screw 130.

A clip 160 may be disposed generally at a junction of the threaded body 142 and the taper 150 to permit rotational movement of the adjustment screw 130 relative to the main body 42 while concurrently preventing withdrawal of the adjustment screw 130 from the main body 42. The clip 160 may be received generally around the adjustment screw 130 once the adjustment screw 130 is inserted into the main body 42.

A seal 162 may be positioned generally between the head 146 of the adjustment screw 130 and the threaded body 142 to prevent debris from entering the housing 14. The seal may engage the taper 150 of the adjustment screw 130 and may similarly engage a surface proximate to the first aperture 50 of the main body 42. In one configuration, the seal 162 is an O-ring and generally surrounds the taper 150 of the adjustment screw 130.

The taper 150 may also include a series of detents 164 in communication with a detent pin 166. The detent pin 166 may be slidably supported within a bore 170 of the housing 14, whereby the bore 170 is in communication with the first aperture 50 of the main body 42. A biasing member 174 such as, for example, a coil spring, may be disposed within the bore 170 (FIG. 5) and may impart a biasing force on the detent pin 166 to urge the detent pin 166 into the first aperture 50. When the adjustment screw 130 is inserted into the first aperture 50, a distal end of the detent pin 166 may engage the detents 164 formed in the taper 150 of the screw 130. When the screw 130 is rotated relative to the housing 14, the detent pin 166 is moved into an out of engagement with adjacent detents 164 and makes an audible noise to allow the user to know exactly how much the screw 130 has been rotated relative to the housing 14.

The detent pin 166 may include a tapered portion 178 terminating at a point 182 at a distal end of the detent pin 166. Likewise, each detent 164 may include a tapered surface 186, whereby the tapered portion 178 of the detent pin 166 engages the tapered surface 186 of a respective detent 164 to allow the screw 130 to be rotated in two directions relative to the housing 14 and to facilitate movement of the point 182 of the detent pin 166 into and out of each detent 164 when the screw 130 is rotated relative to the housing 14. The angle of the tapered portion 178 of the detent pin 166 and/or that of the tapered surface 186 of the detents 164 can be adjusted to either increase or decrease the force required to rotate the screw 130 relative to the housing 14 and/or to adjust the audible noise created when the screw 130 is rotated relative to the housing 14. Furthermore, the spring constant of the biasing member 174 may also be adjusted to both adjust the force required to rotate the screw 130 relative to the housing 14 as well as to adjust the audible noise created when the detent pin 166 moves from one detent 164 to an adjacent detent 164 caused by rotation of the screw relative to the housing 14.

The head 146 of the adjustment screw 130 may also include a marker 188 formed therein. The marker 188 may be an indicator formed in the surface of the head 146 to indicate an adjustment position of the adjustment screw 130. The marker 188 may be painted on and/or laser etched into the surface of the head 146. For example, the marker 188 may be an arrow-shaped marker, a V-shaped marker, a continuous-line marker, a broken-line marker, etc. When the adjustment screw 130 is rotated relative to the housing 14 the marker 188 moves from a first position to a second position indicating adjustment of the height-adjustment mechanism 122.

The adjuster block 134 may interact with the illumination assembly 22 to move the illumination assembly 22 up/down relative to the housing 14. The adjuster block 134 may include a threaded bore 190 and a projection 198 engaged with the illumination assembly 22. The adjustment screw 130 may be threadably received within the threaded bore 190 of the adjuster block 134 such that when the adjustment screw 130 is rotated relative to the housing 14, the adjuster block 134 is moved along an axis substantially perpendicular to the top surface 54 of the main body 42.

The projection 198 may be slideably received within a slot 200 in the illumination assembly 22. The projection 198 may be permitted to slide along a longitudinal axis of the windage adjustment mechanism 126 without moving the illumination assembly 22 to allow for left/right adjustment of the illumination assembly 22. The projection 198 may contact the sidewalls of the slot 200 during adjustment of the adjustment screw 130 to adjust the up/down position of the illumination assembly 22. Because the projection 198 is in engagement with the illumination assembly 22 and is fixed for movement with the adjuster block 134, up/down movement of the projection 198 similarly causes the illumination assembly 22 to move up/down relative to the housing 14.

A biasing member 194 may be disposed between the adjuster block 134 and the illumination assembly 22 and may bias the adjuster block 134 generally along the longitudinal axis of the housing 14 to account for any tolerances in the housing 14, illumination assembly 22, screw 130, and/or adjuster block 134. In one configuration, the biasing member 194 is an O-ring and applies a force on the adjuster block 134 to maintain the adjustment assembly 18 in a desired position in a direction substantially parallel to the longitudinal axis of the housing 14 (i.e., substantially parallel to a line of sight). Allowing the O-ring to impart a force on the adjuster block 134 maintains tight engagement between the adjustment screw 130 and the adjuster block 134 and therefore allows for precise manipulation and movement of the adjuster block 134 relative to the housing 14 while concurrently maintaining a desired position of the adjustment assembly 18 in the direction substantially parallel to the line of sight.

The position of the illumination assembly 22 relative to the housing 14 may be determined based on the position of the adjustment screw 130 relative to the housing 14. For example, the graduations 66 formed on the top surface 54 of the main body 42 may help in determining the relative position of the adjustment screw 130 relative to the main body 42 and, thus, the position of the illumination assembly 22 relative to the main body 42.

The graduations 66 may be permanently attached to the top surface 54 of the housing 14 either via paint and/or laser etching. As such, the graduations 66 maintain the same fixed position relative to the top surface 54 and allow a user to know precisely how much the adjustment screw 130 has moved relative to the housing 14. Furthermore, each graduation 66 may be positioned relative to each detent 164 such that each audible noise or "click" corresponds to movement of the screw 130 one graduation 66.

Once adjustment of the adjustment screw 130 is completed, the biasing member 174, in conjunction with the adjuster block 134, prevents unintended rotation of the adjustment screw 130 due to vibration and the like relative to the housing 14 and, as such, maintains the adjusted position of the adjustment screw 130.

A biasing member 202 (or a pair of biasing members 202) may be used on conjunction with biasing member 174 to further maintain a position of the screw 130 relative to the housing 14. The biasing member 202 may apply a force on the adjuster block 134 and may be positioned between the adjuster block 134 and the housing 14 to exert a force on the adjuster block 134. In another configuration, the biasing member 202 may be positioned between a portion of the illumination assembly 22 and the housing 14 to indirectly impart a force on the adjuster block 134. In either configuration, the biasing member 202 may be a coil spring and may be received within a bore 210 of either the adjuster block 134 or the illumination assembly 22. Alternatively, the biasing member 202 may be positioned and held relative to the adjuster block 134 by a post (not shown) received within the bore 210 of the adjuster block 134 of the illumination assembly 22. Imparting a force on the adjuster block 134 likewise applies a force on the screw 130 and therefore resists relative movement between the screw 130 and the adjuster block 134.

With continuing reference to FIGS. 6-9, the windage-adjustment mechanism 126 may include an adjustment screw 206, a first adjuster block 212, a second adjuster block 214, and a biasing member 218. The adjustment screw 206 may be of a similar construction to that of the adjustment screw 130 and may include a threaded body 222, a head 226, a taper 230 extending generally between the threaded body 222 and the head 226, and a slot 234 formed in the head 226. Additionally, the adjustment screw 206 may include an adjustment indicator, or adjustment marking, 238 (FIG. 5) formed in the head 226 to indicate an adjustment position of the adjustment screw 206. The adjustment indicator 238 may be painted on and/or laser etched into the surface of the head 226. For example, the adjustment indicator 238 may be an arrow, a V-shaped mark, a continuous-line mark, a broken-line mark, etc.

As with the adjustment screw 130, the adjustment screw 206 may be rotated relative to the housing 14 but is not permitted to move along a longitudinal axis extending substantially perpendicular to the side surface 62 of the main body 42. A clip 242 may be disposed generally at a junction of the threaded body 222 and the taper 230 to permit rotational movement of the adjustment screw 206 relative to the main body 42 while concurrently preventing withdrawal of the adjustment screw 206 from the main body 42. The clip 242 may be received generally around the adjustment screw 206 once the adjustment screw 206 is inserted into the main body 42.

A seal 246 may be positioned generally between the head 226 of the adjustment screw 206 and the housing 14 to prevent debris from entering the housing 14. The seal may engage the taper 230 of the adjustment screw 206 and may similarly engage a surface proximate to the second aperture 58 of the main body 42. In one configuration, the seal 246 is an O-ring and generally surrounds the taper 230 of the adjustment screw 206.

The taper 230 may include a series of detents 250 in communication with a detent pin 254. The detent pin 254 may be slidably supported within a bore 258 (FIG. 5) of the housing 14, whereby the bore 258 is in communication with the second aperture 58 of the main body 42. A biasing member 262 such as, for example, a coil spring, may be disposed within the bore 258 and my impart a biasing force on the detent pin 254 to urge the detent pin 254 into the second aperture 58. When the screw 206 is inserted into the second aperture 58, a distal end of the detent pin 254 may engage the detents 250 formed in the taper 230 of the screw 206. When the screw 206 is rotated relative to the housing 14, the detent pin 254 is moved into an out of engagement with adjacent detents 250 and makes an audible noise to allow the user to know exactly how much the screw 206 has been rotated relative to the housing 14.

The detent pin 254 may include a tapered portion 266 terminating at a point 270 at a distal end of the detent pin 254. Likewise, each detent 250 may include a tapered surface 274, whereby the tapered portion 266 of the detent pin 254 engages the tapered surface 274 of a respective detent 250 to allow the screw 206 to be rotated in two directions relative to the housing 14 and to facilitate movement of the point 270 of the detent pin 254 into and out of each detent 250 when the screw 206 is rotated relative to the housing 14. The angle of the tapered portion 266 of the detent pin 254 and/or that of the tapered surface 274 of the detents 250 can be adjusted to either increase or decrease the force required to rotate the screw 206 relative to the housing 14 and/or to adjust the audible noise created when the screw 206 is rotated relative to the housing 14. Furthermore, the spring constant of the biasing member 262 may also be adjusted to both adjust the force required to rotate the screw 206 relative to the housing 14 as well as to adjust the audible noise created when the detent pin 254 moves from one detent 250 to an adjacent detent 250 caused by rotation of the screw 206 relative to the housing 14.

The first adjuster block 212 may include a threaded bore 278. As with the adjuster block 134, the threaded body 222 of the adjustment screw 206 may be threadably received therein such that rotation of the adjustment screw 206 relative to the main body 42 causes the first adjuster block 212 to translate relative to the housing 14 along the longitudinal axis extending substantially perpendicular to the side surface 62. The first adjuster block 212 engages the illumination assembly 22 on a surface opposite the adjustment screw 206. Thus, translation of the first adjuster block 212 correlates to translation of the illumination assembly 22. Translating the illumination assembly 22 relative to the housing 14 similarly causes the reticle 34 to be translated relative to the optical element 26 to adjust the position of the reticle 34 relative to the optical element 26. Adjusting the left/right position of the reticle 34 relative to the optical element 26 adjusts the "windage" of the optical sight 10.

The second adjuster block 214 is similar to the first adjuster block 212 with the exception that the second adjuster block 214 does not include a threaded bore. Rather, the second adjuster block 214 engages a portion of the illumination assembly 22 such that at least a portion of the illumination assembly 22 is disposed between the first and second adjuster blocks 212, 214, as shown in FIG. 9.

The second adjuster block 214 may include a bore 282 partially formed therethrough. The bore 282 may receive at least a portion of the biasing member 218 therein such that the biasing member 218 imparts a force on an end surface generally within the bore 294. Providing the second adjuster block 214 with an internal bore 294 reduces the weight of the second adjuster block 214 and, as such, reduces the overall weight of the optical sight 10. As with the height-adjustment mechanism 122, imparting a bias on the adjuster blocks 212, 214 and, thus, the adjustment screw 206, prevents inadvertent rotation of the adjustment screw 206 relative to the housing 14. Preventing inadvertent rotation of the adjustment screw 206 relative to the housing 14 prevents unwanted movement of the reticle 34 relative to the optical element 26 and ensures that the set position of the adjustment screw 206 relative to the housing 14 is maintained. While the biasing member 218 is shown as being a coil spring, any biasing member that imparts a force on the adjuster blocks 212, 214 to urge the adjuster blocks generally toward the side surface 62 such as, for example, a linear spring, may be employed.

The graduations 70 (FIG. 5) that are permanently affixed to or formed in the side surface 62 of the housing 14 help facilitate adjustment of the adjustment screw 206 relative to the housing 14 and allow a user to visually observe the position of the adjustment screw 206 relative to the housing 14. As with the graduations 66, the graduations 70 may be painted on and/or laser etched into the housing 14 such that the graduations 70 are permanently fixed relative to the housing 14. Furthermore, each graduation 70 may be positioned relative to each detent 250 such that each audible noise or "click" corresponds to movement of the screw 206 one graduation 70.

Figure 10:
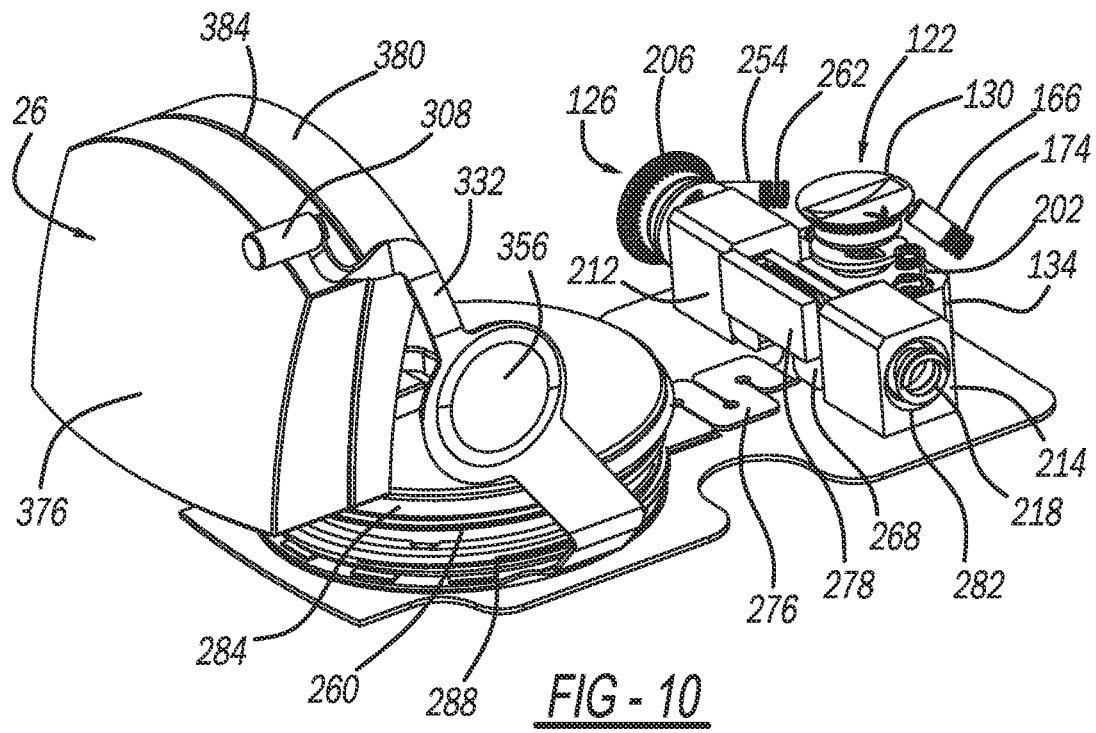
FIG. 10 is a perspective view of the internal components of the optical sight in FIG. 2 with the housing removed.
Figure 13:
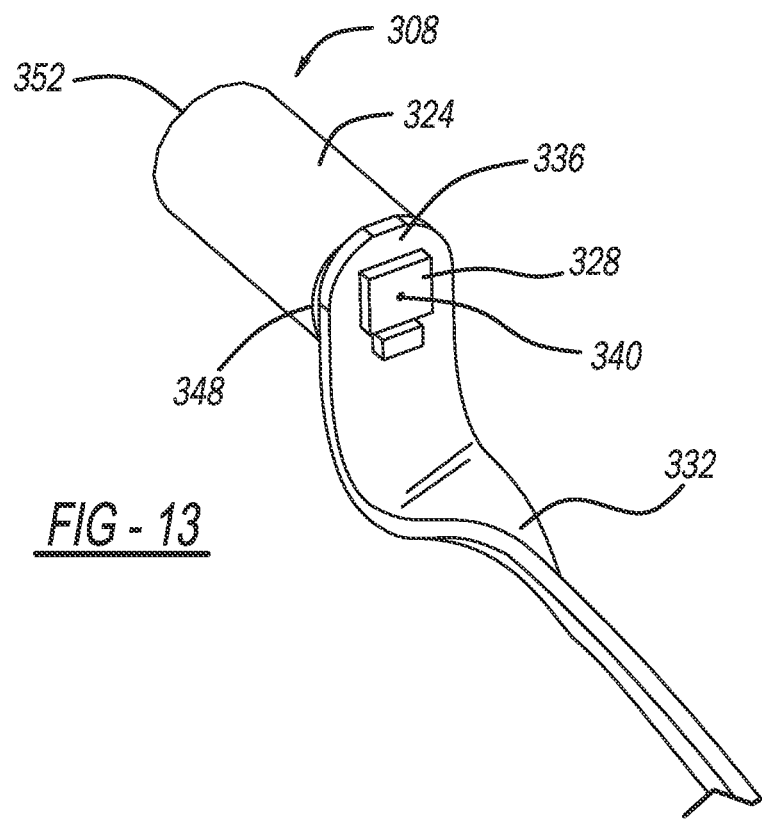
FIG. 13 is a detail view of a photo detector of the optical sight in FIG. 2.
Figure 14:
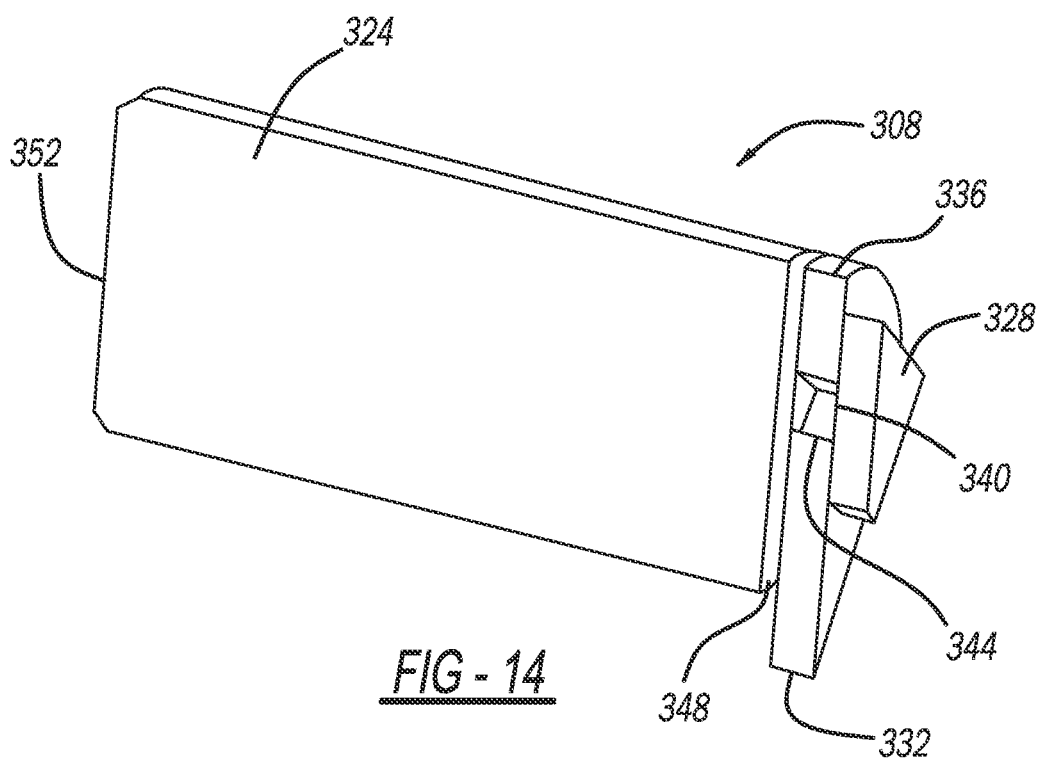
FIG. 14 is a cross-sectional view of the photo detector in FIG. 13.

With particular reference to FIGS. 10-12, the illumination assembly 22 is shown and may include a circuit board 252, a light source 256, and a power source 260. The circuit board 252 may be supported by a substrate, or block, 268 generally within the housing 14, which may include the slot 200 that slidably receives the projection 198 of the adjuster block 134. As described above, the adjuster block 134 may be moved up/down when the adjustment screw 130 is rotated relative to the housing 14. Because the projection 198 is received within the slot 200 of the substrate 268, up or down movement of the adjuster block 134 relative to the housing 14 causes concurrent up or down movement of the substrate 268 relative to the housing 14.

The projection 198 may be slidably received within the slot 200 to permit the substrate 268 to translate along the longitudinal axis of the windage adjustment mechanism 126 relative to the projection 198 when the first and second adjuster blocks 212, 214 are moved in the left/right directions relative to the housing 14.

For example, the substrate 268 may be a U-shaped, or horseshoe-shaped, block having a baseplate 270 extending between a pair of sidewalls 272 defining a cavity or recess 273 therein. The circuit board 252, the light source 256, and the power source 260 may be supported within the recess 273.

A front face 275 of each of the sidewalls 272 may make surface contact with the housing 14. An outside face 277 of each of the sidewalls 272 may engage the first and second adjuster blocks 212, 214, respectively. The outside face 277 of each of the sidewalls 272 may be a flat face, extending along a single plane such that the entire outside face 277 of each sidewall 272 contacts the first or second adjuster block 212, 214, respectively. Because the outside face 277 is a flat face that contacts the first or second adjuster block 212, 214, the substrate 268 is decoupled from potential rotation with the first adjuster block 212. Further, a quantity of components and dimensions are minimalized to reduce a tolerance stack-up dictating an amount of compression on the biasing member 194 between the substrate 268 and the adjustment block 134.

The circuit board 252 may be fixedly attached to the baseplate 270 of the substrate 268 through a contact strip 276 (described below). As such, the circuit board 252 may be fixed for movement with the substrate 268 such that when the substrate 268 is moved by either the adjuster block 134 or the first and second adjuster blocks 212, 214, the circuit board 252 is moved therewith.

The circuit board 252 may support the light source 256 such that movement of the circuit board 252 relative to the housing 14 causes concurrent movement of the light source 256 relative to the housing 14. In one configuration, the light source 256 is encapsulated on the circuit board 252 using a transparent epoxy or other coating. In another configuration, the light source 256 may be disposed proximate to the circuit board 252 and may be attached thereto.

The light source 256 may include a laser, a light-emitting diode (LED), a fiber optic, a tritium lamp, another suitable device configured to emit light, or a combination of these. The light source 256 may include multiple light sources fixed on a light source base plate supported by the circuit board 252 or substrate 268. The light source 256 may be selectively controlled by the circuit board 252 (for example, by a processor or microprocessor on the circuit board 252) in response to ambient light conditions. Illumination of the light source 256 causes the light source 256 to direct light generally toward the optical element 26 to display the reticle 34 on the optical element 26.

The light source 256 may be controlled by the circuit board 252 through a discrete system, a pulse width modulation (PWM) system, or a combination of these. For example, in the discrete system, a consistent supply of power is provided to the light source 256 to illuminate the light source 256. One or more resistors may be incorporated to change a voltage supplied to the light source 256 and control a brightness of the light source 256. For example, one resistor for each brightness level is provided to control the brightness of the light source 256. Thus, the circuit board 252 is able to control the light source 256 to a variety of brightness levels.

For example, in the pulse width modulation (PWM) system, the circuit board 252 may supply power to the light source 256 in an ON-OFF pattern for a particular duty cycle. A voltage regulator may be incorporated to control the voltage pulses provided to the light source 256. The circuit board 252 may control the perceived brightness of the light source 256 by cycling the light source 256 ON and OFF at a frequency high enough that a user's eye does not detect that the light source is being turned ON/OFF. The perceived brightness is a function of the frequency at which the light source is being turned ON/OFF and the duty cycle which represents how long the light source 256 is ON versus how long the light source 256 is OFF.

The frequency may be a rate at which the light source 256 is turned ON/OFF, and the duty cycle may be the length of time that the light source 256 is turned ON/OFF. The light source 256 may receive voltage pulses, for example, at a longer duty cycle to produce a brighter light, and the light source 256 may receive voltage pulses at a shorter duty cycle to produce a dimmer light. For example, at a 20% duty cycle, the light source 256 may be illuminated 20% of the time and off 80% of the time. At a 40% duty cycle, the light source 256 may be illuminated 40% of the time and off 60% of the time. At an 80% duty cycle, the light source 256 may be illuminated 80% of the time and off 20% of the time. At a 100% duty cycle, the light source 256 may be illuminated 100% of the time. The frequency for each of the duty cycles, or the time period from start of cycle to start of cycle, may not change. Thus, an increased duty cycle increases the perceived brightness of the light source 256.

Frequencies in the hundreds of Hz are often fast enough that the human eye cannot perceive that the light source is being switched ON/OFF and perceives a constant light source. In most scenarios these low frequency implementations are sufficient, especially in scenarios in which the light source is stationary. However, when the light source is moving, and the eye is following this movement, the eye can begin to see the cycling on/off of the light source. In some circumstances, such as when an optical sight is moved quickly, poorly executed PWM may be illuminated as a series of dots, known as "PWM visibility." A reflex sight mounted to a weapon presents several scenarios in which the eye is following the light source and the light source is moving. Examples include panning the weapon to track/follow a target and "resetting" the aiming point on a target during recoil. In these scenarios, if the frequency of PWM is not above a certain threshold the user will see the cycling ON/OFF of the reticle. This can become distracting to the shooter. In the case of recoil the user may see what appears to be "multiple" reticles as they try and steady the firearm back on the target.

The minimum frequency threshold for visibility may be impacted by duty cycle. For example, at high duty cycles >50%, the minimum visibility frequency may be lower, for example only, 2 kHz. However, if the duty cycle is lowered to <50%, PWM may start to become visible to some users at 2 kHz. PWM visibility may also be user dependent. Some users may detect PWM at lower frequencies than others. For example, some people may not detect PWM at 2 kHz and a low duty cycle. Others may detect PWM at 2 kHz regardless of duty cycle. Obtained through a series of testing, the optical sight 10 of the present disclosure runs a PWM system that operates at 4 kHz or greater to eliminate "PWM visibility."

The PWM system requires fewer resistors (only one resistor, as compared to three resistors for three brightness settings in a discrete system) and fewer inputs/outputs on a processor of the circuit board 252 (only one input/output, as compared to three inputs/outputs in a discrete system). With fewer inputs and outputs on the processor, the processor size is reduced and/or eliminates a need for an additional expander chip on the processor.

PWM may allow for easier "tuning" of the brightness settings during development since changing the perceived brightness can be accomplished through software changes; whereas a discrete system requires a changing of the physical resistor to change the perceived brightness. Additionally, in some cases, the PWM strategy may increase battery life of the optical sight 10. Use of PWM along with the discrete system allows for optimal reticle illumination considering battery life, reticle brightness, and user preference.

The reticle 34 may be a dot reticle (FIG. 3A), a ring reticle, a crosshair reticle, a combination of these (FIG. 3B—combination dot reticle and ring reticle), or any other suitable reticle. The reticle 34 may incorporate a first reticle 34A, such as a dot reticle, for example, for use in a first set of conditions and a second reticle 34B, such as a ring reticle, for example, for use in a second set of conditions. The reticles 34A and 34B may be used in different brightness settings, such as night vision, very low light, low light, and bright light conditions. The first reticle 34A and the second reticle 34B may be controlled by the discrete system, by pulse width modulation (PWM), or by a combination of these. For example, the first reticle 34A or the second reticle 34B may be controlled by PWM for some brightness settings and by the discrete system for other brightness settings. Controlling the reticle 34 with PWM and the discrete system allows the perceived brightness to be controlled and changed.

For example, the first reticle 34A or the second reticle 34B may be controlled by PWM during all brightness levels. For example, if there are eleven brightness settings, the first reticle 34A or the second reticle 34B may be illuminated by PWM for all eleven brightness settings.

For example, the first reticle 34A or the second reticle 34B may be controlled by the discrete system during a portion of brightness levels. For example, if there are eleven brightness settings, the first reticle 34A or the second reticle 34B may be illuminated by PWM and the discrete system for four of the eleven brightness settings.

The circuit board 252, light source 256, and substrate 268 are protected from environmental conditions by a window 278 that may be disposed generally between the light source 256 and the optical element 26. The window 278 may be sealed against the housing 14 by an epoxy or other suitable adhesive. Positioning epoxy between the window 278 and the housing 14 prevents debris from entering the housing 14 and contacting components of the illumination assembly 22 and adjustment assembly 18.

The housing 14 may project or extend generally over an edge of the window 278 to restrict water and other debris from contacting an outer surface of the window 278. Preventing water and other debris from contacting an outer surface of the window 278 ensures that light from the light source 256 is not diverted, reflected, or blocked and therefore reaches the optical element 26. Because the optical sight 10 may be used on a firearm 30 by law enforcement and/or military personnel, the optical sight 10 may be subjected to extreme weather conditions such as, for example, rain, wind, and ice. Providing the housing 14 that extends over the window 278 helps prevent such weather conditions from reaching the window 278 and therefore improves the ability of the light source 256 to consistently provide light to the optical element 26 and display the reticle 34 thereon.

The power source 260 may be in electrical communication with at least one of the circuit board 252 and light source 256 via the contact strip 276 (FIGS. 10 and 11). In one configuration, the power source 260 may be a battery having a generally circular shape. The battery may be received within a recess 280 (FIG. 6) of the housing 14 and may be held within the recess 280 by a lid 284 threadably received within the recess 280, which allows for removal and replacement of the battery when the battery requires replacement.

The power source 260 may be housed within the recess 280 in an assembly including the lid 284, the power source 260, a retainer 288, and the contact strip 276, in that order (FIGS. 6 and 10). The lid 284 may include a seal 292 disposed between the power source 260 and the lid 284 and a seal 296 disposed on an outside of the lid 284 for engagement with the housing 14. The seals 292 and 296 may be O-rings or other appropriate seals for protecting the recess 280 and power source 260 from debris and moisture. For example, the seals 292 and 296 may be formed of an elastomer or another appropriate sealing material.

The retainer 288 may define a battery cavity 300 for receiving the power source 260 therein. The retainer 288 may be a tubular wall having external threads that engage with threads in the recess 280 of the housing 14. The retainer 288 may be positioned on top of the contact strip 276 and may provide access to contacts 304 fixed to the contact strip 276. The power source 260 may be positioned within the battery cavity 300 and directly engaged with the contacts 304. The seal 292 may bias the power source 260 into a position within the retainer 288 and against the contacts 304. Power may then be transmitted from the power source 260, through the contacts 304, and to the contact strip 276 to be distributed throughout the optical sight 10.

Figure 15:
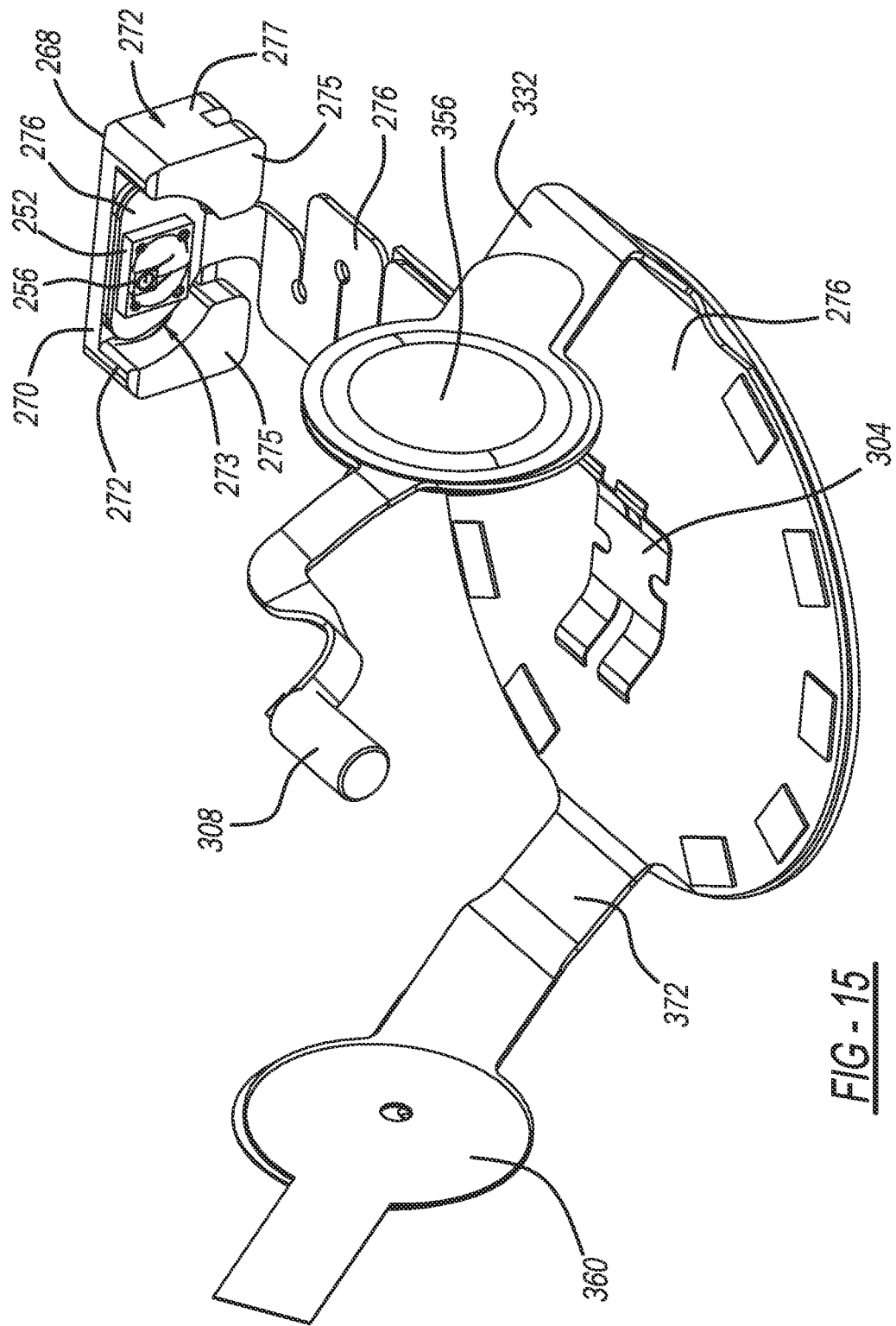
FIG. 15 is a perspective view of the electronics of the optical sight in FIG. 2.

Referring to FIGS. 2, 5, 10, and 13-15, a photoelectric detector 308 may be disposed proximate the optical element 26 that allows light to be collected at the target object and be transmitted to the circuit board 252 via the contact strip 276. More particularly, the contact strip 276 extends from the power source 260 to the circuit board 252 and from the power source 260 to the photoelectric detector 308 such that the circuit board 252, power source 260 and photoelectric detector 308 are all in electrical communication (FIG. 15). The circuit board 252 selectively causes the light source 256 to illuminate in response to ambient light conditions detected at the target object by the photoelectric detector 308.

As shown, more particularly, in FIGS. 2, 4, and 10, the photoelectric detector 308 may be disposed in an upper corner 312 of a forward, or front, face of the housing 14, pointing downrange of the user. For example, the photoelectric detector 308 may be disposed in the upwardly extending optical element housing 46 in a position between the optical element 26 and an intersection of the cross member 110 and the post 102. Because of the concave top surface 118 and the convex bottom surface 114 of the cross member 110, the intersection of the cross member 110 and the post 102 forms a shoulder, or ear, 316 in the upwardly extending optical element housing 46. The shoulder 316 may be a triangular section defined by the cross member 110, post 102, and opening 106. The photoelectric detector 308 may be disposed within an aperture 320 approximately centered in the shoulder 316.

Positioning the photoelectric detector 308 in the shoulder 316 of the upwardly extending optical element housing 46 and pointing the photoelectric detector 308 downrange of the user provides a line-of-sight from the photoelectric detector 308 to the target object without obstruction. Having a clear line-of-sight allows the light intensity at the target object to be accurately detected by the photoelectric detector 308.

The position of the photoelectric detector 308 in the shoulder 316 is advantageous over other configurations in the art. For example, as compared to placement of a sensor on the top surface 118 of the upwardly extending optical element housing 46, the photoelectric detector 308 in the shoulder 316 is directed downrange at the target object and can provide an accurate reading of ambient light at the target object. As compared to placement of a sensor below the optical element 26, the photoelectric detector 308 in the shoulder 316 is not obstructed by back up sights, iron sights, mounting hardware, portions of the barrel 38 or any other parts projecting upwardly from the firearm 30, which gives the photoelectric detector 308 in the shoulder 316 a clear line-of-sight to the target object. As compared to placement of a sensor on or near the circuit board 252, the photoelectric detector 308 in the shoulder 316 is not obstructed by any portion of the optical sight 10 and can provide an accurate reading of ambient light at the target object.

Providing an accurate measurement of ambient light at the target object is advantageous over sensors detecting ambient light at the optical sight. Knowing the light conditions at the target object allows the optical sight 10 to adjust a brightness of the light source 256 based on the light conditions at the target object, which provides an advantage in situations where the light conditions are different at the target object than at the optical sight. For example, when entering a dark space from a well-lit space, being positioned in a dark room and focusing on a target outside or in a well-lit room, standing in or shooting into a shadow, etc., are all situations which benefit from controlling the brightness of the reticle 34 based on the sensed light at the target object.

The photoelectric detector 308 may include a lens 324 and a sensor chip 328 connected to an arm 332 of the contact strip 276. The arm 332 of the contact strip 276 may be a flexible circuit that bends and twists in the post 102 of the upwardly extending optical element housing 46 to route the arm 332 from the photoelectric detector 308 to the power source 260. For example, the arm 332 may extend from the power source 260, along a wall of the post 102, and twist over to align with the power source 260. A distal end 336 of the arm 332 may fit between, or be sandwiched between, the sensor chip 328 and the lens 324.

The sensor chip 328 may be disposed on the distal end 336 of the arm 332. A center 340 of the sensor chip 328 may be aligned with an aperture 344 in the distal end 336 of the arm 332. The aperture 344 may allow the sensor chip 328 to sense light on a side of the arm 332 opposite the sensor chip 328.

The lens 324 may be a rod-shaped lens that projects through the aperture 320 in the upwardly extending optical element housing 46. Alternatively, the lens 324 may be a spherical lens, a curved-plate lens, or any appropriately-shaped lens. The lens 324 may be a transparent lens. For example, the lens 324 may be formed of glass, plastic, or another suitable, transparent material.

A proximal end 348 of the lens 324 may abut the distal end 336 of the arm 332 and be axially aligned with the aperture 344. A distal end 352 of the lens 324 may be axially aligned with the target image when the optical sight 10 is aligned with the target image, such that the distal end 352 of the lens 324 communicates ambient light from the target image through the lens 324, through the aperture 344, and to the sensor chip 328.

The sensor chip 328 may be configured to detect light through the aperture 344. For example, the sensor chip 328 may include a photodiode or other suitable type of device configured to detect light. For example, the photodiode may be a photoconductive detector, a photovoltaic detector, or another suitable detector. For example, the photo diode may be a p-i-n detector, an avalanche photodiode, a schottky barrier photodiode, a metal-semiconductor-metal photodiode, a type II superlattice photodetector, a photoelectromagnetic detector, a quantum well intersubband photodetector, and a quantum dot infrared photodetector.

The illumination assembly 22 may include a first actuation member 356 and a second actuation member 360. Each actuation member 356, 360 may be used to control illumination of the light source 256 and each may be associated with a cover 364, 368. The actuation members 356, 360 may be electrically connected to the contact strip 276, such that the actuation members 356, 360 are in electrical communication with the circuit board 252. For example, each of the actuation members 356, 360 may be fixed on an arm 332, 372 of the contact strip 276.

In one configuration, the first and second actuation members 356, 360 may be button switches in contact with respective covers 364, 368. The covers 364, 368 may be formed from a flexible material such as rubber or plastic such that when a force is applied to either cover 364, 368, the respective cover 364, 368 deflects and transmits the applied force to the associated actuation member 356, 360. When either cover 364, 368 is depressed, the actuation member 356, 360 associated with the particular cover 364, 368 is actuated to control operation of the light source 256. Such control may be facilitated by providing descriptive markings on at least one of the covers 364, 368. For example, providing one actuation member 356 with a positive sign (+) and providing the other actuation member 360 with a negative sign (−) provides the user with a quick reference as to which cover 364, 368 and associated actuation member 356, 360 increases (+) or decreases (−) illumination.

With particular reference to FIG. 6, the optical element 26 is shown to include a doublet lens having a first lens 376, a second lens 380, and a dichroic coating 384 formed on at least one of the first and second lenses 376, 380 to allow light from the light source 256 to be reflected thereon. Coating one of the lenses 376, 380 with the dichroic coating 384 allows the light source 256 to generate the reticle 34 in an area generally between the lenses 376, 380 and therefore allows the reticle 34 to be displayed on the optical element 26. The lenses 376, 380 may include a substantially D-shape and may include an upper surface 388 having a generally convex shape. Once the optical element 26 is installed in the housing 14, the upper surface 388 of the optical element 26 may be positioned generally adjacent to the bottom surface 114 of the cross member 110.

The lenses 376, 380 may be spherical lenses, whereby at least one of the lenses 376, 380 includes a diameter substantially within a range of about 30 millimeters to about 45 millimeters, or within a range of about 40 millimeters to about 41 millimeters, or about 40.54 millimeters, having a tolerance of plus or minus 0.2 millimeters. Once the spherical lenses 376, 380 are formed, an overall height of the lenses 376, 380 may be substantially within a range of about 15 millimeters to about 20 millimeters, or within a range of about 17 millimeters to about 18 millimeters, or about 17.17 millimeters, having a tolerance of plus or minus 0.10 millimeters. Regardless of the exact size of the lenses 376, 380, the optical element 26 may include an effective focal length within a range of about 25 millimeters to about 40 millimeters, or within a range of about 35 millimeters to about 36 millimeters, or about 35.88 millimeters, having a tolerance of plus or minus 0.12 millimeters. The optical element 26 may be formed from SCHOTT S-3 Grade A fine annealed material.

With continued reference to FIGS. 1-15, operation of the optical sight 10 will be described in detail. Once the optical sight 10 is mounted to the firearm 30, the optical sight 10 may be adjusted to properly align the position of the reticle 34 relative to the barrel 38 of the firearm 30. A flathead screwdriver, a generally flat member (such as a coin or spent ammunition shell), or another appropriate member may be inserted into the slot 154 of the adjustment screw 130 to rotate the adjustment screw 130 relative to the housing 14. Rotation of the adjustment screw 130 relative to the housing 14 causes concurrent up/down movement of the adjuster block 134 relative to the housing 14. Because the projection 198 of the adjuster block 134 is slidably received within a slot 200 of the substrate 268, the substrate 268 is caused to move concurrently in the up or down direction with the adjuster block 134.

Movement of the substrate 268 in either the up or down direction causes concurrent movement of the circuit board 252 in the up or down direction. Because the light source 256 is mounted on the circuit board 252 or otherwise fixed to the substrate 268, the light source 256 is similarly caused to move in either the up or down direction. The light source 256 outputs light through the window 278 and toward the optical element 26 to generate the reticle 34 on the optical element 26. Therefore, up or down movement of the substrate 268 and light source 256 causes concurrent up or down movement of the reticle 34 on the optical element 26.

Once the position of the reticle 34 is adjusted in the up/down direction, the flathead screwdriver or other member may be removed from engagement with the adjustment screw 130. As with the height-adjustment mechanism 122 of the optical sight 10, the up/down position of the reticle 34 relative to the optical element 26 is maintained due to the force imparted on the adjuster block 134 by biasing members 174, 202. Specifically, biasing members 202 apply a force on the adjuster block 134 between the housing 14 and the adjuster block 134 while biasing member 174 applies a force directly on the adjustment screw 130 to hold the adjuster screw in place. Additionally, the biasing member 194 applies a force on the adjuster block 134 between the substrate 268 and the adjuster block 134.

The left/right (i.e., windage) of the reticle 34 may be adjusted by inserting a flathead screwdriver, a flat member (such as a coin or spent ammunition shell), or another appropriate member into the slot 234 of the adjustment screw 206. Once the flathead screwdriver or other flat member is inserted into the slot 234 of the adjustment screw 206, rotation of the adjustment screw 206 relative to the housing 14 causes concurrent movement of the first and second adjuster blocks 212, 214. Movement of the adjuster blocks 212, 214 causes concurrent movement of the substrate 268 relative to the housing 14 in a direction toward and away from the side surface 62 of the main body 42. Because the substrate 268 supports the light source 256, movement of the substrate 268 in either the left or right direction relative to the housing 14 similarly causes movement of the light source 256 relative to the housing 14. As described above, movement of the light source 256 relative to the housing 14 causes concurrent movement of the reticle 34 relative to the optical element 26. Once the position of the reticle 34 relative to the optical element 26 is adjusted, the flathead screwdriver or flat tool may be removed from engagement with the adjustment screw 206. As with the windage-adjustment mechanism 126 of the optical sight 10, the set position of the windage is maintained due to the force imparted on the first and second adjuster blocks 212, 214 by the biasing member 218.

Once the up/down position and windage position of the reticle 34 is properly adjusted relative to the optical element 26, the optical sight 10 may be used to align the barrel 38 of the firearm 30 relative to a target (not shown).

The reticle 34 may be illuminated by the light source 256. For example, in low ambient light conditions at the target object, sufficient light may be projected by the light source 256 when the light source is controlled solely by PWM and only one of the first reticle 34A and the second reticle 34B may be necessary. Thus the other of the first reticle 34A and the second reticle 34B, controlled by resistors, is not illuminated. Under brighter or daytime conditions, the light source 256 may illuminate both the first reticle 34A and the second reticle 34B using both resistors and PWM. Under bright conditions at the target object, the first reticle 34A may be illuminated in conjunction with the second reticle 34A to provide a sufficient aiming point at the target object. Alternatively, under brighter or daytime conditions, the light source 256 may illuminate both of the first reticle 34A and the second reticle 34B using only resistors or only PWM.

Figure 16:
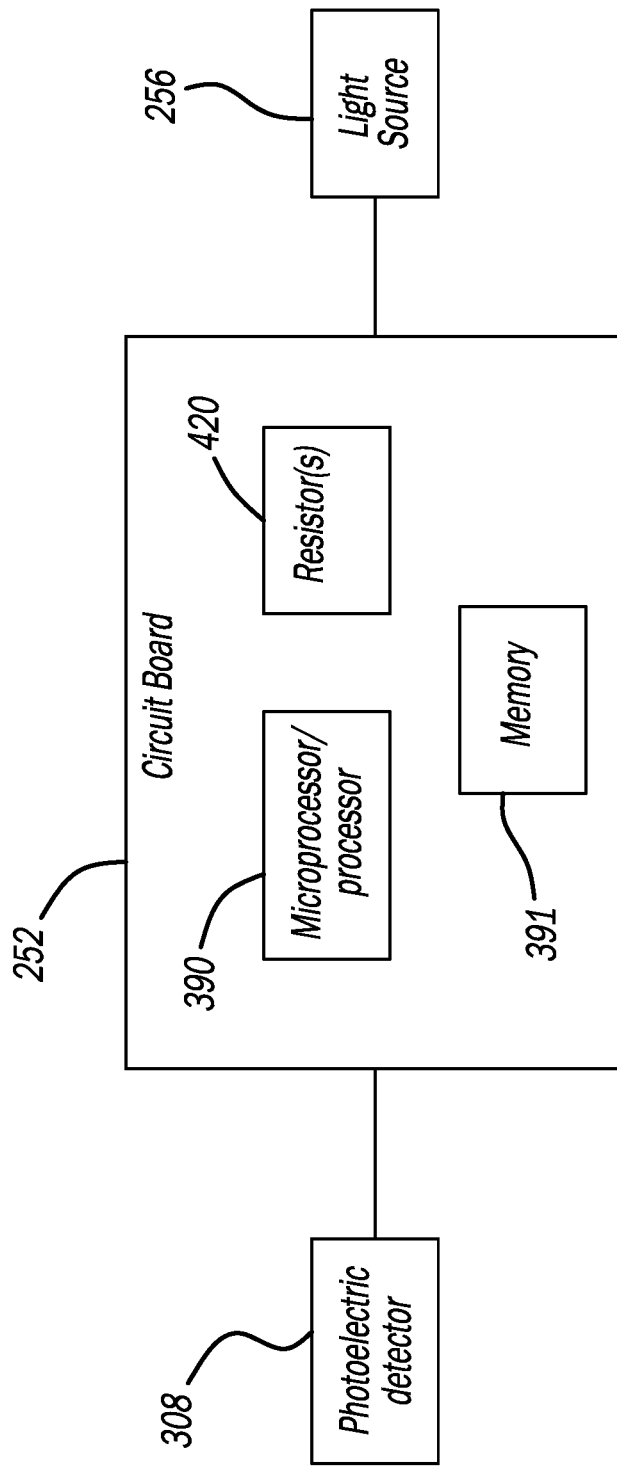
FIG. 16 is a schematic of a circuit board of the optical sight in FIG. 2.
Figure 17:
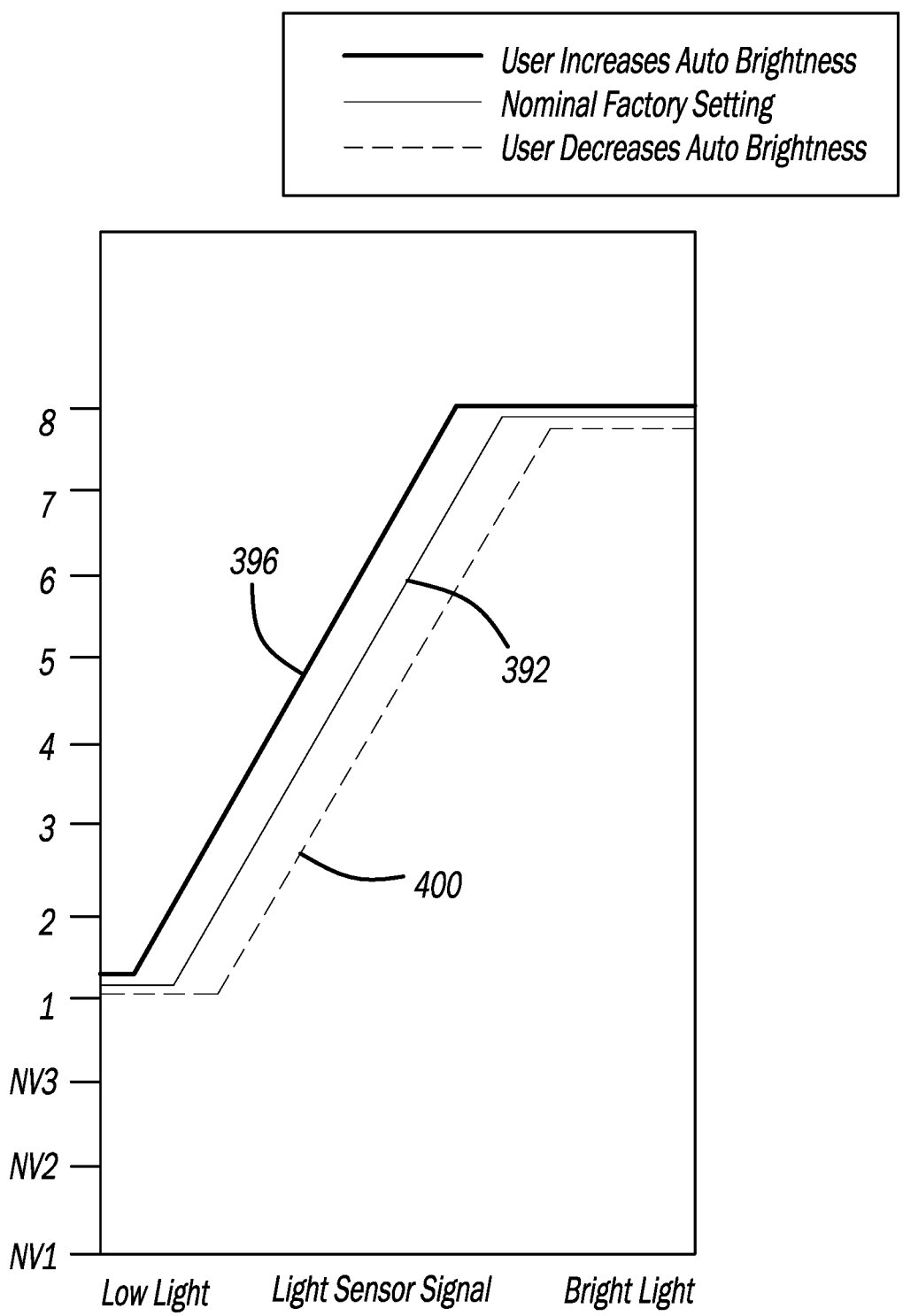
FIG. 17 is a graph showing an automatic brightness control method for the reticle of the optical sight in FIG. 2.

The brightness of the reticle 34 may be automatically controlled at the circuit board 252. For example, with reference to FIG. 16, the circuit board 252 may include a processor, or microprocessor, 390 and a memory 391. The microprocessor 390 may receive the signal from the photoelectric detector 308 and determine whether to illuminate the first reticle 34A, the second reticle 34B, or the first reticle 34A and the second reticle 34B. Alternatively, the microprocessor 390 may receive a signal from a user input and determine whether to illuminate the first reticle 34A, the second reticle 34B, or the first reticle 34A and the second reticle 34B based on the user input. Referring to FIG. 17, the automatic brightness may be controlled according to a brightness curve. More particularly, in a normal mode, the circuit board 252 may control the brightness of the light source 256 according to a first curve 392. The first curve 392 may have a lower brightness setting at low light and may increase to a higher brightness setting as brightness increases. The user may have the option to increase or decrease the first curve 392 based on user preference (for example, using first and second actuation members 356, 360). For example, if the user prefers a brighter reticle 34, the user may increase the auto brightness setting to a high setting, following a second curve 396. If the user prefers a dimmer reticle 34, the user may decrease the auto brightness setting to a low setting, following a third curve 400. The curves 396 and 400 may follow the same slope as the curve 392, but may be shifted one level up or one level down to adjust the overall brightness accordingly.

Figure 18:
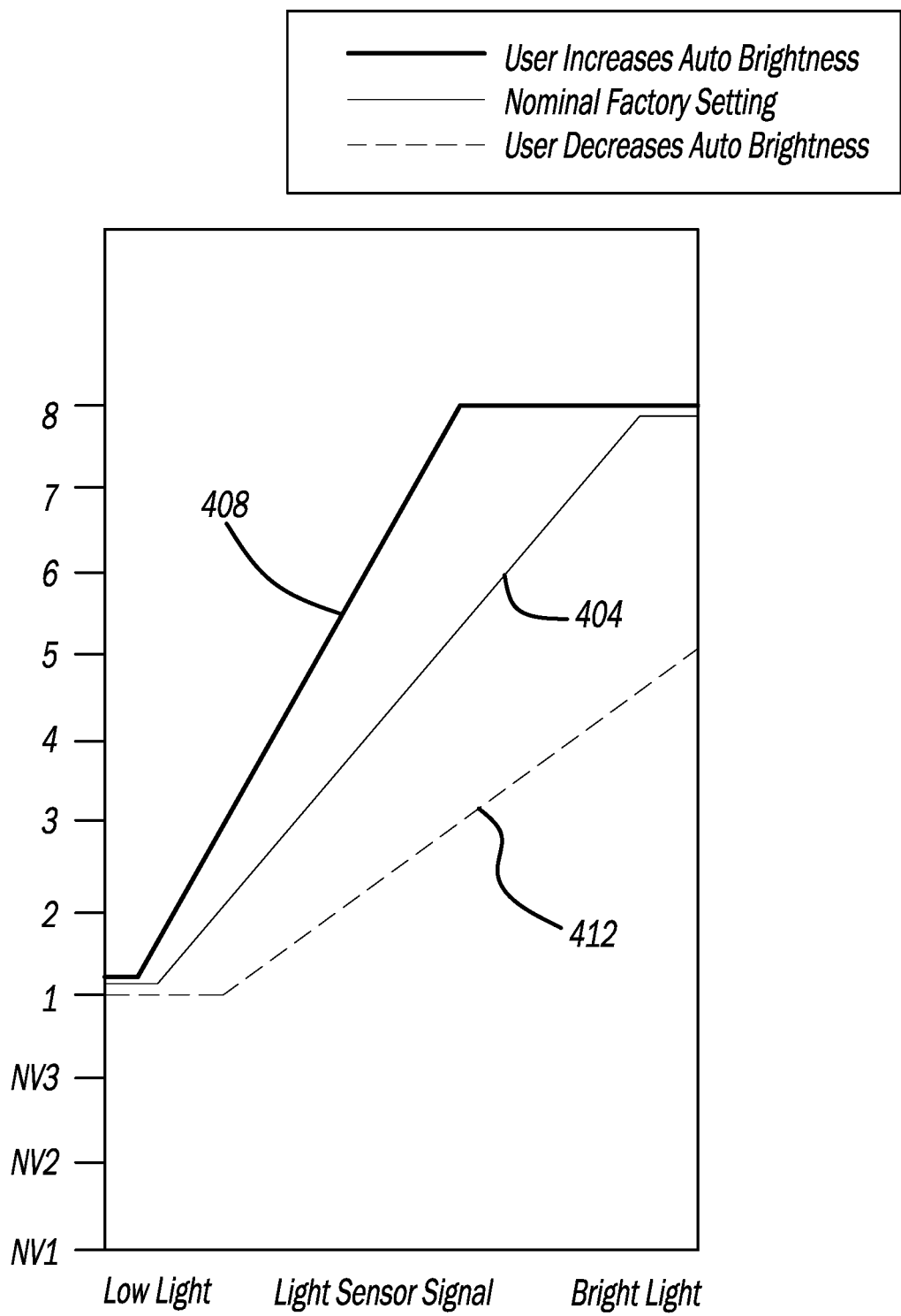
FIG. 18 is a graph showing another automatic brightness control method for the reticle of the optical sight in FIG. 2.

Referring to FIG. 18, the automatic brightness may be controlled according to an alternative brightness curve. More particularly, in a normal mode, the circuit board 252 may control the brightness of the light source 256 according to a first curve 404. The first curve 404 may be similar to the first curve 392 and have a lower brightness setting at low light and may increase to a higher brightness setting as brightness increases. The user may have the option to increase or decrease the first curve 404 based on user preference. For example, if the user prefers a brighter reticle 34, the user may increase the auto brightness setting to a high setting, following a second curve 408. As compared to the first curve 404, the second curve 408 may be shifted up and may have a sharper, or greater, slope for increasing light intensity as the sensed light brightens. If the user prefers a dimmer reticle 34, the user may decrease the auto brightness setting to a low setting, following a third curve 412. As compared to the first curve 404, the third curve 412 may be shifted down and may have a softer, or smaller, slope for increasing light intensity as the sensed light brightens.

Once the processor 390 determines a brightness level from the appropriate curve, the processor 390 connects power to one or more resistors 420 to illuminate the light source 256. For example, in a configuration where the light source 256 includes 11 brightness settings for each of the reticles 34A and 34B, the circuit board 252 may house 11 resistors. The voltage for 11 brightness settings for the reticle 34A (for example, the dot reticle) may be controlled by 7 resistors, with 3 resistors controlling the voltage for 7 PWM settings and 4 resistors controlling the voltage for 4 discrete settings. Meanwhile, the voltage for the 11 PWM brightness settings for the reticle 34B (for example, the ring reticle) may be controlled by 4 resistors. The implementation of PWM in this example, saves the optic 11 resistors and 11 inputs/outputs from the processor 390.

Because the optical element 26 includes the dichroic coating 384 disposed on at least one of the first lens 376 and the second lens 380, the wave length of the light from the light source 256 is reflected and causes the reticle 34 to appear in the optical element 26 along the line-of-sight. The reticle 34 may be used by the user to align the barrel 38 of the firearm 30 with the target object.

Figure 19:
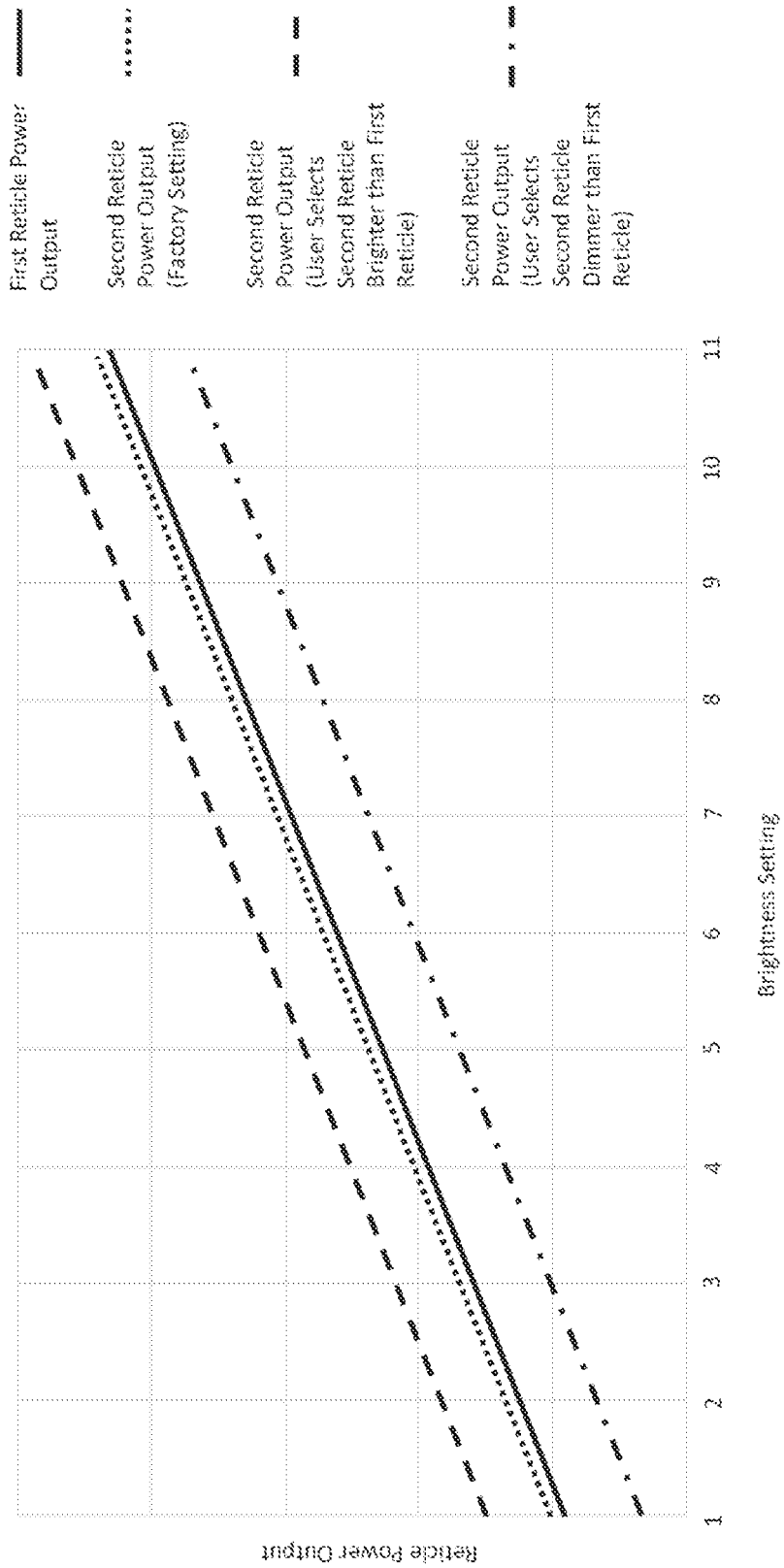
FIG. 19 is a graph showing another automatic brightness control method for the reticle of the optical sight in FIG. 2.

Referring to FIG. 19, the user may be able to select whether to illuminate the first reticle 34A, the second reticle 34B, or the first reticle 34A and the second reticle 34B. The user may further adjust the brightness of the second reticle 34B relative to the first reticle 34A. The user may further adjust the brightness of the first reticle 34A relative to the second reticle 34B.

The ability to adjust relative brightness may provide the user with the ability to tune the reticle 34A, 34B to their own preference, or to a particular shooting scenario. For example where the brightness of the second reticle 34B may be adjusted relative to the first reticle 34A, if a user is expecting to primarily be in a close-quarters scenario, the user may want a bright second reticle 34B (for example, the segmented circle) as a primary gross aiming point, but still have the first reticle 34A (for example, the dot) available should the user need to take a more precise shot. Since the first reticle 34A is dimmer than the second reticle 34B in this scenario, the first reticle 34A will not provide any distraction or large obscuration. In the opposite scenario, the user may want the first reticle 34A (for example, the dot) brightly lit for precise shooting, but still have a dim second reticle 34B (for example, the segmented circle) should the user need to take shots at close-quarters. The latter scenario allows the user to easily focus on the first reticle 34A, and prevents the second reticle 34B from obscuring the target, or overpowering (washing-out) the first reticle 34A. Allowing the first and second reticle 34A, 34B to have different brightness levels can aid a user in easily focusing on the "brighter" of the two reticles 34A, 34B, without having to completely turn off the other reticle 34A, 34B. The dimmer reticle 34A, 34B will still be available to the user should they need it, but will be far less distracting when the user doesn't need the dimmer reticle 34A, 34B as the primary aiming point.

For example, FIG. 19 illustrates the above example where the brightness of the second reticle 34B may be adjusted relative to the first reticle 34A. A default setting of the optic 10 may be that the first reticle 34A and the second reticle 34B are at "equivalent brightness" (shown by the solid line and the dotted line in FIG. 19). For example a dot and a ring together would appear to be equally as bright. Through a series of button presses or other user inputs, the user may access a mode in which they can adjust the brightness of the second reticle 34B relative to the first reticle 34A. They can choose between the default setting (equal brightness), a high setting in which the second reticle 34B is brighter than the first reticle 34A (for example, the dashed line), and a low setting in which the second reticle 34B is dimmer than the first reticle 34A (for example, the dash-dot line).

During the default setting, the first reticle 34A may operate along the solid line and the second reticle 34B may operate along the dotted line. If the user chooses the high setting, the first reticle 34A may continue operation along the solid line and the operation of the second reticle 34B may transition from the dotted line to the dashed line. If the user chooses the low setting, the first reticle 34A may continue operation along the solid line and the operation of the second reticle 34B may transition from the dotted line to the dash-dot line. If the second reticle 34B is operating in the high setting and the user chooses the default setting, or decreases the brightness setting, operation of the second reticle 34B may transition from the dashed line to the dotted line. If the second reticle 34B is operating in the low setting and the user chooses the default setting, or increases the brightness setting, operation of the second reticle 34B may transition from the dash-dot line to the dotted line. Operation would be similar for the example where brightness of the first reticle 34A may be changed relative to the second reticle 34B. In this case, the first reticle 34A may move between the dotted line, dashed line, and dash-dot line along with user input, while the second reticle 34B would remain on the solid line.

Figure 20:
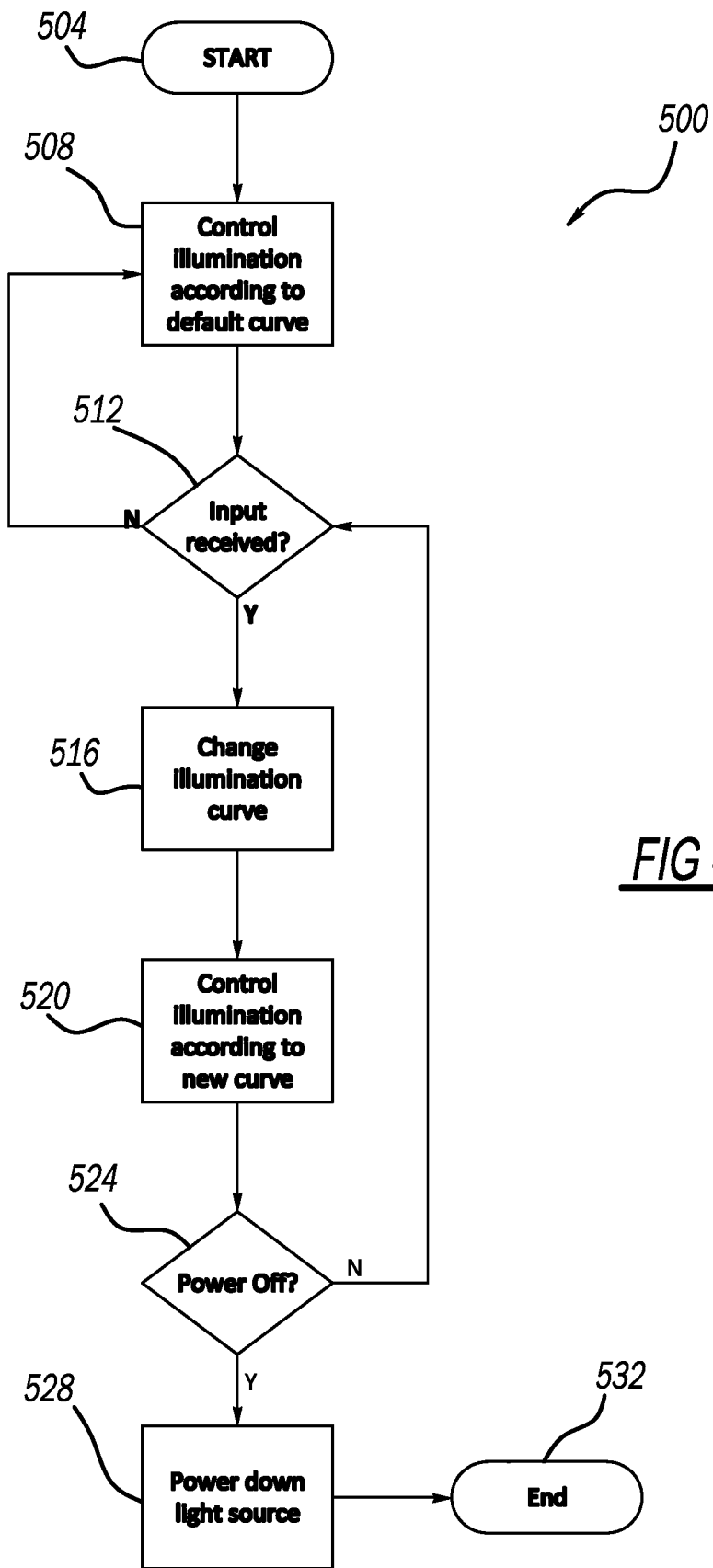
FIG. 20 is a flow chart for a method of controlling a brightness of a reticle of an optical sight according to the present disclosure.

Now referring to FIG. 20, a flowchart for a method 500 of controlling brightness of the reticle is illustrated. The method 500 may be executed by the circuit board 252, the microprocessor or processor 390 on the circuit board 252, or a controller on the microprocessor or processor 390.

The method 500 starts at 504. At 508, brightness of the reticle is controlled according to a default curve. For example, the circuit board 252 may receive the output from the photoelectric detector 308 and may control the light source 256 to illuminate the reticle 34 according to a default curve. For example, the default curve may be a nominal factory setting as illustrated in FIGS. 17 and 18. For example, the default curve may be a nominal factory setting as illustrated in the solid line and dotted line in FIG. 19. Alternatively, the default curve may be any curve stored in the memory 391 of the circuit board 252.

At 512, a check for input received from a user is performed. For example, the user may input commands for brightness of the reticle using the first actuation member 356 and the second actuation member 360. Each actuation member 356, 360 may be associated with a cover 364, 368. For example, the first actuation member 356 associated with the cover 364 may be pressed to decrease, or dim, the illumination. For example, the second actuation member 360 associated with the cover 368 may be pressed to increase, or brighten, the illumination. The cover 364 may include a minus sign and the cover 368 may include a plus sign to indicate the function of the actuation member 356, 360. Alternatively, the user input may be received from a series of buttons or other actuation members.

If false at 512, method 500 returns to 508 and illumination is controlled according to the default curve. If true at 512, the default curve is changed to a new curve according to the user input at 516. For example, if the default curve is the nominal factory setting (thin solid line) in FIG. 17 or FIG. 18 and the user input is activation of the first actuation member 356 through the cover 364, the default curve is changed to the decreased auto brightness curve (the dashed line) in FIG. 17 or FIG. 18. For example, if the default curve is the nominal factory setting (thin solid line) in FIG. 17 or FIG. 18 and the user input is activation of the second actuation member 360 through the cover 368, the default curve is changed to the increased auto brightness curve (the bold solid line) in FIG. 17 or FIG. 18.

Alternatively, if the default curve is the increased auto brightness curve (the bold solid line) in FIG. 17 or FIG. 18 and the user input is activation of the first actuation member 356 through the cover 364, the default curve is changed to the nominal factory setting (thin solid line) in FIG. 17 or FIG. 18. For example, if the default curve is the decreased auto brightness curve (the dashed line) in FIG. 17 or FIG. 18 and the user input is activation of the second actuation member 360 through the cover 368, the default curve is changed to the nominal factory setting (thin solid line) in FIG. 17 or FIG. 18.

Similarly, the brightness of the second reticle 34B may be adjusted relative to the first reticle 34A or the brightness of the first reticle 34A may be adjusted relative to the second reticle 34B. More particularly, the default brightness of the first reticle 34A may be the solid line in FIG. 19 and the default brightness of the second reticle 34B may be the dotted line in FIG. 19. The solid line may be similar to the dotted line and have a lower power output at lower brightness settings and may increase the power output as the brightness setting increases. If the user input increases the auto brightness setting to a high setting, the dotted line may transition to the dashed line in FIG. 19. As compared to the dotted line, the dashed line may be shifted up, having a higher reticle power output for each brightness setting. If the user input decreases the auto brightness setting to a low setting, the dotted line may transition to the dash-dot line in FIG. 19. As compared to the dotted line, the dash-dot line may be shifted down, having less reticle power output for each brightness setting. The same scenarios would be true for adjusting the first reticle 34A relative to the second reticle 34B.

At 520, brightness of the reticle is controlled according to the new curve. For example, the circuit board 252 may receive the output from the photoelectric detector 308 and may control the light source 256 to illuminate the reticle 34 according to the new curve. As illustrated in FIGS. 17 and 18, as the brightness output from the photoelectric detector 308 increases, the brightness setting for the light source 256 and illumination of the reticle 34 increases. Likewise in FIG. 19, as the brightness setting increases, the reticle power output for the reticle increases.

At 524, a check for input received from a power input is performed. For example, the user may select a power button to power up or power down the optic 10. Alternatively, for example, the light source 256 may be on a timer and may shut off after illumination for a threshold amount of time.

If false at 524, method 500 may return to 512. If true at 524, method 500 may power down, or shut off, the light source 256 at 528. Method 500 ends at 532.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An optical sight comprising:
   a housing;
   an optical element supported by the housing;
   a sensor positioned in the housing, the sensor being configured to detect ambient light at a target object;
   a light source configured to selectively illuminate a reticle on the optical element; and
   a controller configured to control illumination of the reticle based on an output from the sensor,
   wherein the controller is configured to control the light source to constantly illuminate the reticle based on a first output from the sensor and illuminate the reticle in pulses based on a second output from the sensor, the first output being different from the second output.

2. The optical sight of claim 1, wherein the light source includes a light emitting diode, a fiber optic, a tritium lamp, a laser, or a combination thereof.

3. The optical sight of claim 2, wherein the light source includes a plurality of light sources.

4. The optical sight of claim 1, wherein the controller is configured to control illumination of the light source using pulse width modulation, discrete illumination, or a combination of these.

5. The optical sight of claim 4, wherein the controller is configured to control illumination of the light source using only pulse width modulation for a portion of brightness settings and using a combination of pulse width modulation and discrete illumination for a portion of brightness settings.

6. A method for controlling brightness of a reticle on an optical sight, the method comprising:

illuminating, by a light source, a reticle on an optical element;
   controlling, by a controller, a brightness of the illuminating by the light source according to an output from a sensor and a first brightness curve, the first brightness curve being stored in a memory of the controller;
   switching, by the controller, from the first brightness curve to a second brightness curve based on a user input, the second brightness curve being stored in the memory of the controller; and
   controlling, by the controller, the brightness of the illuminating by the light source according to the output from the sensor and the second brightness curve when the first brightness curve is switched by the controller to the second brightness curve.

7. The method of claim 6, wherein the switching from the first brightness curve to the second brightness curve includes detecting the user input through actuation of an actuator.

8. The method of claim 6, wherein the second brightness curve is a dimmer curve than the first brightness curve and corresponds to a decreased brightness user input.

9. The method of claim 6, wherein the second brightness curve is a brighter curve than the first brightness curve and corresponds to an increased brightness user input.

10. An optical sight comprising:
    a housing;
    an optical element supported by the housing;
    a light source configured to illuminate a first reticle and a second reticle on the optical element; and
    a controller configured to control the light source to selectively illuminate the first reticle based on a first of a plurality of brightness curves and selectively illuminate the second reticle based on a second of the plurality of brightness curves, the controller being configured to change one of the first and the second of the plurality of brightness curves based on a user input to change a brightness of the one of the first and the second reticles relative to the other of the first and the second reticles.

11. The optical sight of claim 10, wherein the light source includes a light emitting diode, a fiber optic, a tritium lamp, a laser, or a combination thereof.

12. The optical sight of claim 10, wherein the user input is a brightness control button.

13. The optical sight of claim 10, wherein the plurality of brightness curves includes a dim brightness curve, a first reticle default brightness curve, a second reticle default brightness curve and a bright brightness curve, the controller being configured to control the light source to selectively illuminate the first reticle based on the first reticle default brightness curve and the second reticle based on the second reticle default brightness curve until the user input is selected.

14. The optical sight of claim 13, wherein the user input is configured to be manipulated to select between the dim brightness curve, the first reticle default brightness curve, and the bright brightness curve.

15. The optical sight of claim 13, wherein the controller is configured to illuminate the first reticle based on the first reticle default curve and to illuminate the second reticle based on the bright brightness curve when the user input is selected.

16. The optical sight of claim 10, further comprising a light sensor, wherein the light sensor is a photo detector configured to detect ambient light at a target object, and the controller is configured to control the light source to selectively illuminate the first reticle and the second reticle based on an output from the light sensor.

17. The optical sight of claim 16, wherein the photo detector is disposed on a downrange-facing portion of the housing.

18. The optical sight of claim 17, wherein the user input is a brightness control button.

19. The optical sight of claim 10, wherein the plurality of brightness curves is stored in a memory of the controller.

20. The optical sight of claim 10, wherein the controller is configured to control the light source to selectively illuminate the first reticle and the second reticle based on one of a plurality of brightness curves using a combination of pulse width modulation and discrete illumination.

* * * * *